US012803797B2

(12) United States Patent
Miller et al.

(10) Patent No.: US 12,803,797 B2
(45) Date of Patent: Nov. 17, 2026

(54) CRYPTOGRAPHIC KEY GENERATION USING MACHINE LEARNING

(71) Applicant: CoinCircle, Inc., Santa Monica, CA (US)

(72) Inventors: Erick Stephen Miller, Marina Del Rey, CA (US); Koutarou Maruyama, Culver City, CA (US)

(73) Assignee: CoinCircle, Inc., Santa Monica, CA (US)

( * ) Notice: Subject to any disclaimer, the term of this patent is extended or adjusted under 35 U.S.C. 154(b) by 74 days.

(21) Appl. No.: 18/376,771

(22) Filed: Oct. 4, 2023

(65) Prior Publication Data

US 2024/0121080 A1 Apr. 11, 2024

Related U.S. Application Data

(60) Provisional application No. 63/414,433, filed on Oct. 7, 2022.

(51) Int. Cl.
*H04L 9/08* (2006.01)
*H04L 9/00* (2022.01)
(Continued)

(52) U.S. Cl.
CPC .......... *H04L 9/0866* (2013.01); *H04L 9/0816* (2013.01); *H04L 9/14* (2013.01);
(Continued)

(58) Field of Classification Search
CPC ....... H04L 9/0866; H04L 9/0816; H04L 9/14; H04L 9/50; H04L 9/0662; H04L 9/304;
(Continued)

(56) References Cited

U.S. PATENT DOCUMENTS 6,363,485 B1 * 3/2002 Adams .................. H04L 9/3231 713/186
8,312,291 B2 * 11/2012 Golic .................. G06V 40/172 713/172

(Continued)

FOREIGN PATENT DOCUMENTS

EP 3203679 A1 8/2017

OTHER PUBLICATIONS

PCT International Search Report and Written Opinion, PCT Application No. PCT/US2023/034473, Jan. 24, 2024, nine pages.

(Continued)

*Primary Examiner* — Jeremiah L Avery
*Assistant Examiner* — Abdullah Almamun
(74) *Attorney, Agent, or Firm* — Fenwick & West LLP

(57) ABSTRACT

Embodiments relate to a computer-implemented method for generating a cryptographic key for a user. A user signal associated with the user is input to a machine learning model. The machine learning model has multiple layers and the applied input generates outputs at each of these layers. A vector is extracted from one or more outputs of one or more layers of the machine learning model. A cryptographic key is generated from the vector. The same cryptographic key is generated for different vectors produced by different variations of the user signal from the same user, but different cryptographic keys are generated for user signals from different users. The cryptographic key may be used for various purposes, including authenticating the user, encrypting/decrypting data, and controlling access to resources.

20 Claims, 13 Drawing Sheets

(51) Int. Cl.
*H04L 9/14* (2006.01)
*H04L 9/40* (2022.01)

(52) U.S. Cl.
CPC ................ *H04L 9/50* (2022.05); *H04L 63/08* (2013.01); *H04L 63/10* (2013.01)

(58) Field of Classification Search
CPC ....... H04L 9/3247; H04L 63/08; H04L 63/10; G06F 11/10
See application file for complete search history.

(56) References Cited

U.S. PATENT DOCUMENTS

| | | | | |
|---|---|---|---|---|
| 10,198,399 | B1 | 2/2019 | Fritchman et al. | |
| 10,210,388 | B2 | 2/2019 | Derakhshani et al. | |
| 11,120,159 | B1 * | 9/2021 | Ketharaju | G06F 21/50 |
| 11,301,586 | B1 | 4/2022 | Poh et al. | |
| 11,709,922 | B2 * | 7/2023 | Grajek | G06N 5/022<br>713/186 |
| 11,861,041 | B2 | 1/2024 | Truong et al. | |
| 12,026,242 | B2 * | 7/2024 | Takahashi | H04L 9/0643 |
| 2013/0004033 | A1 * | 1/2013 | Trugenberger | G06F 21/32<br>382/125 |
| 2016/0050067 | A1 * | 2/2016 | Merchan | H04L 9/0866<br>713/171 |
| 2016/0100314 | A1 * | 4/2016 | Chung | H04L 63/0861<br>713/186 |
| 2016/0352520 | A1 * | 12/2016 | Schwach | H04L 9/0866 |
| 2018/0343120 | A1 | 11/2018 | Andrade | |
| 2020/0110864 | A1 * | 4/2020 | Casado | G06N 3/006 |
| 2020/0259638 | A1 * | 8/2020 | Carmignani | H04L 9/085 |
| 2021/0029100 | A1 * | 1/2021 | Bendersky | H04L 63/0876 |
| 2021/0211291 | A1 * | 7/2021 | Jindal | H04L 9/3231 |
| 2021/0328801 | A1 * | 10/2021 | Sly | G06V 40/168 |
| 2021/0334814 | A1 * | 10/2021 | Sawant | G06Q 30/0603 |
| 2022/0075859 | A1 | 3/2022 | Kruczek et al. | |
| 2022/0366027 | A1 * | 11/2022 | Hall | H04L 9/0866 |
| 2022/0368701 | A1 * | 11/2022 | Achleitner | H04L 63/1416 |
| 2023/0057547 | A1 | 2/2023 | Shah et al. | |
| 2023/0086191 | A1 | 3/2023 | Jakobsson | |
| 2023/0216687 | A1 | 7/2023 | Garg et al. | |
| 2023/0273682 | A1 * | 8/2023 | Wei | A61B 5/7267<br>345/8 |
| 2024/0111851 | A1 * | 4/2024 | Lock | G06N 20/00 |
| 2024/0311445 | A1 * | 9/2024 | Slawinski | G06F 16/16 |
| 2025/0335903 | A1 * | 10/2025 | Azanza Ladrón | G06F 21/32 |
| 2025/0390879 | A1 * | 12/2025 | Marcus | G06Q 20/4016 |

OTHER PUBLICATIONS

United States Office Action, U.S. Appl. No. 18/376,773, Sep. 3, 2025, 16 pages.

* cited by examiner

CRYPTOGRAPHIC KEY GENERATION USING MACHINE LEARNING

CROSS-REFERENCE TO RELATED APPLICATION(S)

This application claims priority under 35 U.S.C. § 119(e) to U.S. Provisional Patent Application Ser. No. 63/414,433, "Cryptography Using Machine Learning of Object Representations," filed Oct. 7, 2022. The subject matter of all of the foregoing is incorporated herein by reference in their entirety.

FIELD OF THE DISCLOSURE

This disclosure relates generally to cryptography, and more particularly, to using machine learning models to generate cryptographic keys.

BACKGROUND

Cryptography is the discipline of securing communications and data, typically through the use of cryptographic keys. Cryptography and cryptographic keys are used for many purposes in modern computer systems. Some examples include securing communications, data encryption, digital signatures, access control to resources, preservation of integrity and provenance, and authentication of users.

Important aspects of any cryptographic system include how the cryptographic keys are generated, and also how they are distributed, stored and otherwise managed. It is desirable for these functions to be easy and reliable for the user, but also secure to maintain the integrity of the overall system. It is important to ensure that cryptographic keys are protected from unauthorized access and tampering and that their integrity is maintained. Furthermore, in most practical systems, these functions must be scalable in order to accommodate a large number of users and an even larger number of keys.

SUMMARY

Embodiments relate to a computer-implemented method for generating a cryptographic key for a user. A user signal associated with the user is input to a machine learning model. The machine learning model has multiple layers and the applied input generates outputs at each of these layers. A vector is extracted from one or more outputs of one or more layers of the machine learning model. A cryptographic key is generated from the vector. The same cryptographic key is generated for different vectors produced by different variations of the user signal from the same user, but different cryptographic keys are generated for user signals from different users. The cryptographic key may be used for various purposes, including authenticating the user, encrypting/decrypting data, and controlling access by the user to resources.

In some embodiments, a system implements the above process for many users. The system includes a machine learning model, a key generation engine, and an access control server. User signals are applied to the machine learning model, and the outputs from the machine learning model are used to generate vectors for the user signals. The key generation engine generates cryptographic keys based on these vectors. The access control server then controls accesses by the users based on the cryptographic keys. In different embodiments, instances of the machine learning model and key generation engine may be operated by the access control server or by user devices.

Other aspects include components, devices, systems, improvements, methods, processes, applications, computer readable mediums, and other technologies related to any of the above.

The figures depict and the detail description describes various non-limiting embodiments for purposes of illustration only.

DETAILED DESCRIPTION

The figures and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
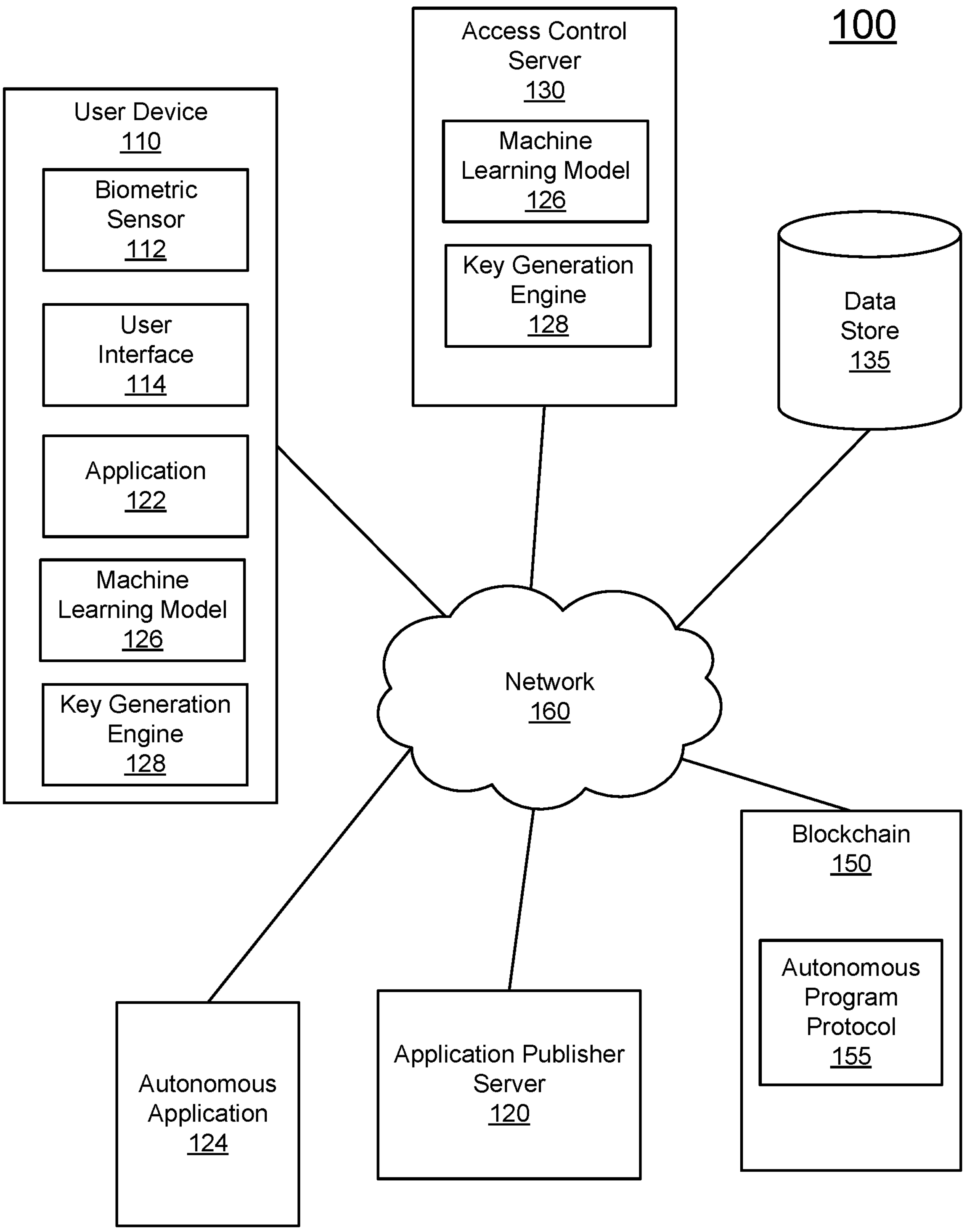
(FIG. 1 is an example system environment, in accordance with some embodiments.

FIG. 1 is a block diagram that illustrates a system environment 100 of an example computing server, in accordance with an embodiment. By way of example, the system environment 100 includes a user device 110, an application publisher server 120, an access control server 130, a data store 135, a blockchain 150, and an autonomous program protocol 155. The entities and components in the system environment 100 communicate with each other through the network 160. In various embodiments, the system environment 100 may include different, fewer, or additional components. The components in the blockchain system environment 100 may each correspond to a separate and independent entity or may be controlled by the same entity. For example, in some embodiments, the access control server 130 may control the data store 135. In another example, the access control server 130 and the application publisher server 120 are the same server and the access control server 130 serves as an authentication engine for the software application operated by the application publisher server 120.

While each of the components in the system environment 100 is often described in disclosure in a singular form, the system environment 100 may include one or more of each of the components. For example, there can be multiple user devices 110 communicating with the access control server 130 and the blockchain 150. Each user device 110 is used by a user and there can be millions or billions of users in this system environment 100. Also, the access control server 130 may provide service for multiple application publishers 120, each of whom provides services to multiple users that may operate different user devices 110. While a component is described in a singular form in this disclosure, it should be understood that in various embodiments the component may have multiple instances. Hence, in the system environment 100, there can be one or more of each of the components.

The user device 110 may include a sensor 112, a user interface 114, an application 112, a machine learning model 126, and a key generation engine 128. In various embodiments, the user device 110 may include one or more of those components. In some embodiments, the user device 110 may include different, fewer, or additional components. A user device may also be referred to as a client device. A user device 110 may be controlled by a user who may be the customer of the application publisher server 120, the customer of the access control server 130, or a participant of the blockchain 150. In some situations, a user may also be referred to as an end user, for example, when the user is the application publisher's customer who uses applications that are published by the application publisher server 120. The user device 110 may be any computing device. Examples of user devices 110 include personal computers (PC), desktop computers, laptop computers, tablet computers, smartphones, wearable electronic devices such as smartwatches, or any other suitable electronic devices.

A sensor 112 captures one or more signals from the user (referred to as user signals) and, as discussed further below, the user signals may be input into the machine learning model 126 and the key generation engine 128 to generate a cryptographic key that is used for authentication and access of one or more applications and functionalities in the system environment 100. The cryptographic key may also be used for encryption or other suitable ways that will be discussed in further detail below. The user signals can be any unique, identifiable, classifiable, or labelable input that can be recognized and was previously learned by the machine learning model during a training phase. The machine learning model learns variations of the user signal for the same user. As a result, the same cryptographic key is generated for different variations of the user signal from the same user, but different cryptographic keys are generated for user signals from different users.

The sensor 112 may take different forms. For example, in some embodiments, the sensor 112 may take the form of one or more cameras to capture one or more images (e.g., facial, iris or another body part), whether the image is a single image or a compilation of different images from various angles captured by different cameras of the user device 110 (e.g., a smart phone with multiple cameras). The signals in this example are one or more images. In some embodiments, the sensor 112 may take the form of an infrared sensor (e.g., an infrared camera) that may or may not be paired with another sensor or device such as a flood illuminator, a proximity sensor, an ambient light sensor, etc. The infrared sensor may capture the images of the user, or images of any other unique, identifiable, classifiable, or labelable input that can be recognized and was previously learned by machine learning model during a training phase. In yet another example, in some embodiments, the sensor 112 may take the form of a microphone that captures the audio of the user, which is the signal in this example. In yet another example, in some embodiments, the sensor 112 may take the form of a fingerprint sensor that captures the fingerprint of the user. In yet another example, in some embodiments, the sensor 112 may take the form of a brain sensor (e.g., electrical brain sensor, EEG device, MEG device, optical brain sensor, another electrode) that monitors the brainwaves of the user, such as in the case where the user device 110 takes the form of a wearable electronic device such as a virtual reality headset (e.g., a head mounted display). In yet another example, in some embodiments, the sensor 112 may take the form of an accelerometer and gyroscope that monitors the user's movement. The user's movement may be the signals that are captured in this example. In some embodiments, the sensor 112 may be another suitable sensor. In some embodiments, the user device 110 may include one or more sensors 112 and the various sensors work together to generate a set of different signals that are used for the machine learning model 126 and the key generation engine 128 to generate a cryptographic key.

While in this disclosure the signals are primarily discussed using signals from people as examples, the signals may also be images or other identifiable signals from objects (unique things possessed by a user), animals, or digital images or other digital objects and representations.

The user device 110 may include a user interface 114 and an application 122. The user interface 114 may be the interface of the application 122 and allow the user to perform various actions associated with application 122. In some embodiments, the application 122 may require authentication before the user may use the application 122. The user may use the cryptographic key generated by the machine learning model 126 and the key generation engine 128 to perform the authentication. The detailed process will be discussed further below. The user interface 114 may take different forms. In some embodiments, the user interface 114 is a software application interface. For example, the application publisher server 120 may provide a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface of the application publisher server 120 that allows clients to perform actions through web browsers. The front-end software application includes a graphical user interface (GUI) that displays various information and graphical elements. In another embodiment, user interface 114 does not include graphical elements but communicates with the application publisher server 120 via other suitable ways such as command windows or application program interfaces (APIs).

The user device 110 may store a machine learning model 126 and a key generation engine 128. The machine learning model 126 may be trained to distinguish various signals from different images. The type of machine learning model 126 may vary, depending on the type of signals captured by the sensor 112 in various embodiments. For example, in some embodiments, the machine learning model 126 may take the form of an image classifier that is capable of distinguishing images of various inputs, people or objects that are captured by cameras. The machine learning model 126 may receive the signals of the user captured by the sensor 112. A vector may be extracted from the 126, such as from a latent space of an inner layer of the machine learning model 126 and/or from the output of the machine learning model 126.

The key generation engine 128 may include computer code that includes instructions that may take the form of one or more computer algorithms to generate a cryptographic key from the vector extracted from the machine learning model 126. The key generation engine 128 may perform encoding of the vector, apply an error correction scheme to the encoded representation, and use a cryptographically secure pseudo random number generator to generate an encryption key, nonce, salt, and pepper derived from the cryptographic key. Detailed operations of the key generation engine 128 are further discussed below. The cryptographic key generated may take various suitable forms based on the state-of-the-art cryptography standard, whether the key is symmetric or asymmetric, elliptic or not, static or ephemeral.

In various embodiments, the cryptographic key generated may be used in various different contexts, depending on the implementations. For example, a cryptographic key may be used for data encryption, authentication, digital signature, key wrapping, and a master key. The cryptographic key generated by the key generation engine 128 may be a private key and a corresponding public key may be generated using standard public-key cryptography methods. Specific examples of usage of the cryptographic key may include, but are not limited to, the following. In some embodiments, the cryptographic key may be used as a blockchain wallet for the blockchain 150 for the user to participate in the blockchain 150 directly. In some embodiments, the cryptographic key may be used in an authentication process for a user to log into a trading platform (e.g., a broker, an exchange, etc.) for trading cryptocurrencies, tokens, non-fungible tokens (NFTs), fiat currencies, securities, derivatives, and other assets. In some embodiments, the cryptographic key may be used in a payment application that authenticates a user before the user may initiate or complete a transaction. In some embodiments, the cryptographic key may be used in a database application for a user to encrypt and decrypt data. In some embodiments, the cryptographic key may be used to log in to any applications in the system environment 100, such as the application 122, the autonomous application 124, and the autonomous program protocol 155. Other examples of usage of the cryptographic key are also possible.

An application publisher server 120, which may be operated by a company such as a software company, may provide and operate various types of software applications. The types of applications published or operated by the application publisher server 120 may include an application 122 that is installed at a user device 110, an autonomous application 124 that may be a decentralized application that is run on a decentralized network or a blockchain, and the autonomous program protocol 155 that is recorded on a blockchain 150. The autonomous program protocol 155 may take the form of a smart contract or another type of autonomous algorithm that operates on a blockchain. The autonomous application 124 and autonomous program protocol 155 may be Web3 applications that have similar natures. In some embodiments, the autonomous application 124 may also operate on a blockchain and the autonomous application 124 is an example of autonomous program protocol 155. In some embodiments, the autonomous application 124 may serve as an interface of the autonomous program protocol 155. For example, the autonomous application 124 may allow a user to access one or more functions of the autonomous program protocol 155 through the interface of autonomous application 124. In some embodiments, the application publisher server 120 may record a fully autonomous application on the blockchain 150 as the autonomous program protocol 155 and operate different applications, such as the application 122 and autonomous application 124 to allow a user, a device, or an automated agent to interact with the autonomous program protocol 155. In some embodiments, as discussed in further detail below throughout this disclosure, the autonomous program protocol 155 published by the application publisher server 120 may incorporate certain protocols (e.g., access control protocols) of the access control server 130 to provide security and access control to the autonomous program protocol 155. In various embodiments, the cryptographic key generated by the key generation engine 128 may be used to authenticate a user for any of the applications described herein.

An access control server 130 may be a server that provides various access control services on behalf of one or more application publisher servers 120. For example, the access control server 130 determines whether a digital signature generated by a cryptographic key of the user device 110 is authenticated. In some embodiments, the access control server 130 may be part of the application publisher server 120 and may provide the authentication feature for the application operated by the application publisher server 120. In some embodiments, the access control server 130 may be operated by a software-as-a-service company that provides authentication services to various software companies. For example, the login process of an application 122 may be routed to the access control server 130 and the access control server 130 authenticates the user.

Depending on embodiments, the machine learning model 126 and the key generation engine 128 may be resided locally on a user device 110 and/or on the access control server 130. For example, in some embodiments, the user device 110 does not include the machine learning model 126 or the key generation engine 128. Instead, the user device 110 captures signals of the user by the sensor 112 and transmit the signals to the access control server 130. The access control server 130 uses the machine learning model 126 to generate a vector that in turn is converted to a cryptographic key by the key generation engine 128. The access control server 130 uses the generated cryptographic key to authenticate the user and provides a response to the application publisher server 120 and/or the user device 110 on whether the user is authenticated.

The data store 135 includes one or more storage units such as memory that takes the form of non-transitory and non-volatile computer storage medium to store various data. The computer-readable storage medium is a medium that does not include a transitory medium such as a propagating signal or a carrier wave. The data store 135 may be used by the application publisher server 120, the access control server 130, and/or the user device 110 to store relevant data related to authentication. In some embodiments, the data store 135 communicates with other components by the network 160. This type of data store 135 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 135 is a storage device that is controlled and connected to the access control server 130. For example, the data store 135 may take the form of memory (e.g., hard drives, flash memory, discs, ROMs, etc.) used by the access control server 130 such as storage devices in a storage server room that is operated by a server.

A blockchain 150 may be a public blockchain that is decentralized, a private blockchain or a semi-public blockchain. A public blockchain network includes a plurality of nodes that cooperate to verify transactions and generate new blocks. In some implementations of a blockchain, the generation of a new block may also be referred to as a mining process or a minting process. Some of the blockchains 150 support smart contracts, which are a set of code instructions that are stored on a blockchain 150 and are executable when one or more conditions are met. Smart contracts may be examples of autonomous program protocols 155. When triggered, the set of code instructions of a smart contract may be executed by a computer such as a virtual machine of the blockchain 150. Here, a computer may be a single operation unit in a conventional sense (e.g., a single personal computer) or may be a set of distributed computing devices that cooperate to execute the code instructions (e.g., a virtual machine or a distributed computing system). A blockchain 150 may be a new blockchain or an existing blockchain such as BITCOIN, ETHEREUM, EOS, NEO, SOLANA, AVALANCHE, etc.

The autonomous program protocols 155 may be tokens, smart contracts, Web3 applications, autonomous applications, distributed applications, decentralized finance (DeFi) applications, protocols for decentralized autonomous organizations (DAO), non-fungible tokens (NFT), and other suitable protocols and algorithms that may be recorded on a blockchain.

The communications among the user device 110, the access control server 130, the autonomous application 124, the application publisher server 120 and the blockchain 150 may be transmitted via a network 160, for example, via the Internet. In some embodiments, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet switching networks such as the Internet.

Figure 2:
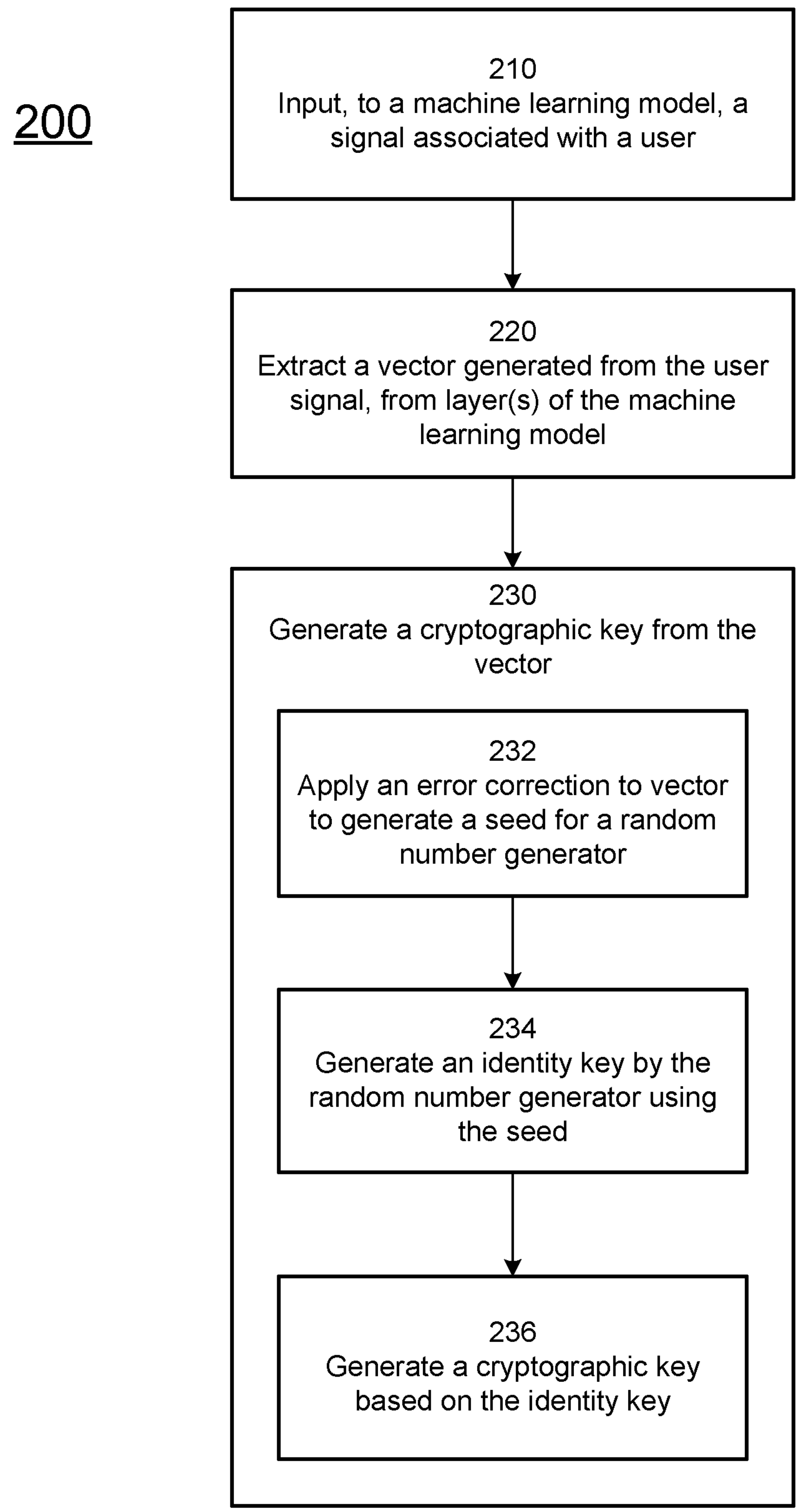
FIG. 2 is a flowchart depicting an example process for generating a cryptographic key using a machine learning model, in accordance with some embodiments.

FIG. 2 is a flowchart depicting an example process 200 for generating a cryptographic key using a machine learning model, in accordance with some embodiments. The process 200 may be performed by a computing device, such as a user device 110 or an access control server 130 using the machine learning model 126 and key generation engine 128. The process 200 may be embodied as a software algorithm that may be stored as computer instructions that are executable by one or more processors. The instructions, when executed by the processors, cause the processors to perform various steps in the process 200. In various embodiments, the process 200 may include additional, fewer, or different steps.

In process 200, a computing device may be used to capture complex high-entropy multi-dimensional data (digital sensor data, digital images, digital voice, data, etc.) then encode the captured data using machine learning and cryptography into a secure, reproducible cryptographic system with encryption keys (symmetric or asymmetric, with other cryptographic information and metadata) that can be used repeatedly and reliably to encrypt personal data, for authentication, for cryptographic digital signatures, for data verification, for identity verification, and to reliably and securely execute digital monetary transactions across a computer network (e.g., a centralized or decentralized network).

For example, given a chosen "type" or "types" of signal data input that is captured by a sensor 112 (e.g., pixels of a human face that represent identity biometrics), the computing device may use a machine learning model 126 that has learned the embedding vectors. An embedding vector may be a mathematical vector that is extracted from one or more layers of the machine learning model such as from a latent space of the machine learning model. The learned embedding vectors can be one or more floating point normalized multi-dimensional vectors (e.g., in some embodiments, 128-dimensional floating point numerical encodings in Euclidean space) typically derived via machine learning methods including clustering, the use of deep neural networks, deep metric learning, and other deep learning methods. The machine learning model may be configured so that the model may be used to generate new generalized predictions of new multi-dimensional vectors, given the machine learning model has not seen the new input signal data before (e.g., new pixels of new human faces) such that all sample predictions are relative to each other within the same normalized multi-dimensional Euclidean space.

Referring to the detail of the process 200, in some embodiments, a computing device may input 210, to a machine learning model, a signal associated with a user. For example, this user signal may be captured from a user by a sensor 112 of a user device 110. Training of the machine learning model is described in further detail below in association with FIG. 3A. The machine learning model is trained by the user device 110 or by a server. For example, in some embodiments, the machine learning model is packaged as part of a key generation software and is pre-trained by a computing server, such as access control server 130. The machine learning model used may take various forms, such as a perceptron, a feed forward model, a radial basis network (RBF), a deep feed forward model (DFF), a recurrent neural network (RNN), a long short term memory (LSTM) model, a gated recurrent model (GRU), an auto encoder (AE), a variational auto encoder (VAE), a sparse auto encoder (SAE), a denoising auto encoder (DAE), a Markov chain (MC), a hidden Markov model (HMI), a Hopfield network (HN), a Boltzmann machine (BM), a restricted Boltzmann machine (RBM), a deep believe model (DBN), a convolutional neural network (CNN), a Convolutional Inverse Graphics Network (CIGN), a Generative Adversarial Network (GAN), a Liquid State Machine (LSM), an Extreme Learning Machine (ELM), an Echo Network Machine (ENM), a Kohonen Network (KN), a Deep Residual Network (DRN), a Support Vector Machine (SVM), or a Neural Turing Machine (NTM). Another suitable model may also be used.

In some embodiments, a computing device may extract 220 a vector generated from the user signal from one or more layers of the machine learning model. For example, given new input data of the same type (e.g., pixels of human face), the computing server may use the trained machine learning model to extract a metric space multi-dimensional floating point vector, such that the model can generalize new data. The machine learning model may be trained to generate the vector based on input signals. When a new user signal is captured by the sensor 112 (e.g., using the object's input signature to regenerate the cryptographic key), a distance function is evaluated to determine the distance between the vector trained and the vector that is newly generated based on the new signal. When the distance function is evaluated, the closer to zero (or some threshold value) the distance becomes, the more probable the identity of the two inputs being compared are of the same classification. For example, are the faces of the same person? Is that input of the same type, category and/or class? The vector may be extracted from a hidden layer and/or an output layer of the machine learning model, depending on the embodiments.

In some embodiments, a computing device may generate 230 a cryptographic key from the vector. The same cryptographic key is generated for different vectors produced by different variations of the user signal from the same user, and different cryptographic keys are generated for vectors from different users.

FIG. 2 also shows a specific embodiment for step 230. In this embodiment, the computing devices may apply 232 an error correction scheme to the vector to generate a seed for a random number generator. The error correction may be applied to the vector itself or to an encoded version of the vector. For example, a computing device may encode the floating point multi-dimensional vector using a "binary spatial segment field" representation of the floating point number so that the Hamming distances between different vectors can act as an analog heuristic and/or approximation for distance. Additional detail on the encoding scheme is described below.

Example details of the error correction scheme used within the encoding scheme, and referred to as the "error correction scheme" throughout this disclosure are as follows. Reed Solomon error correction codes (ECC) may be extracted and generated from the original binary encoded vector. In some embodiments, the original binary encoding vector is deterministically shuffled prior to extracting and generating the ECC. The ECC and the external validator metadata may be saved. The ECC may be later applied to the new vector derived from new input data for variable error correction and as a polynomial-space validation method on new input variations.

In some embodiments, a computing device may generate 234 an identity key by the random number generator using the seed. The random number generated may be with a large repeating cycle to avoid key conflicts in generating the key. For example, a cryptographically secure pseudo random number generator (CSPRNG) seeded directly from full resolution unique input data for random uniqueness/cryptographic security (shuffle, select, reduce) may be used to generate key, salt, pepper. If the error correction process did not succeed 100% (and only applied a partial correction) in generating the seed, which is a codeword for the ECC, this step causes a dramatic difference in key generation to occur due to a wrong input being used as the seed of the random number generator. As such, although the input data may have been nearly similar, the resultant output is significantly very much different.

An example pseudocode of the key generation process is illustrated below.

```
--Key generation process
  image = loadImage(user)
  neuralNetwork = loadModel(/local/package/path)
  idVector = neuralNetwork.predict(image)
  encoded = binarySpatialSegmentEncoder(idVector)
  encoded = errorCorrection(encoded)
  keys = keyGenerator(encoded)
```

In some embodiments, a computing device may generate 236 a cryptographic key based on the identity key. In some embodiments, an asymmetric encryption key creation process is used to cryptographically secure deterministic key with shuffle, CSPRNG and multi-hashing techniques. The identity key itself or a varied version of the identity key may be used. For example, the identity key generated from step 234 may be shuffled and hashed one or more times because a final string of bits is used in a cryptographic key generation algorithm to generate the key.

An example pseudocode of a cryptographic key generation algorithm is illustrated below.

```
--Key generator algorithm
  Function keyGenerator(enc):
    encode = hashFunction(enc)
    RandomGen = cryptoSecureRandom(seed=encode)
    shuffled = RandomGen.shuffle(enc)
    random = RandomGen.rand( )
    key = hashFunction(shuffled + rand)
  return(key)
```

The cryptographic key generated may be validated, such as using a public data validator. Public validation file for encryption, authentication, validation and reproduction of keys may be used. The file may be triple encrypted, and homomorphic encrypted for final validation gate-keeper data.

In some embodiments, cryptographic authentication of key creation prior to use with RSA signatures may be used to protect against tampering and bit flip attacks.

In some embodiments, another gatekeeper may be used. For example, a homomorphic Euclidean distance check validation between original (encrypted) input data and current input data may be performed to verify the validity of the input data.

The cryptographic key generated may be used in various embodiments. In some embodiments, the private keys and data are generated entirely on the user's personal device and can be used for encryption, signatures and verification without ever being transmitted across any computer network or to any server. In some embodiments, only non-identifiable non-private, encrypted and/or public data that does not contain the secret keys is sent across a computer network or to a server for the purpose of data recovery at a later date.

In some embodiments, the non-identifiable non-private, encrypted and/or public data is stored on a public blockchain, making the data available without the need for a trusted third party. In some embodiments, the data may be generated from a face and the cryptographic keys may be used for the purpose of secure passwordless account authentication (login) secure passwordless account recovery (lost phone) or the unique cryptographic keys may be used to directly verify, sign and execute single party or multi-party secure digital wallet transactions. In some embodiments, the keys are used directly as the public/private key pair for a digital wallet to execute and/or sign transactions, or to derive new keys as part of a decentralized hierarchical deterministic digital wallet. In some embodiments, the keys are used to create private keys and/or encrypt a digital wallet's existing private key, which is in turn used to execute digital wallet transactions.

In some embodiments, the keys are used to cryptographically authenticate the user prior to allowing the user to perform a digital wallet transaction. In some embodiments, the keys are used to encrypt a shared secret derivation of the digital wallet's private key, such that at an unknown later date the user (and only the user) can recover their wallet's private key in a secure and trustless way, supplying only the requisite input data, such as their biometrics or other input data. In some embodiments, the keys are used to encrypt one or more shared secrets derived from the digital wallet's private key for the purpose of trust-less multi-party secure digital wallet private key recovery. In some embodiments, the keys are used to execute or sign multi-party transactions known as multi-signature transactions where other trusted parties must also cryptographically authorize the transaction prior to its ability to execute.

In various embodiments, a wide variety of machine learning techniques may be used for the training of the machine learning model 126. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), transformers, attention models, generative adversarial networks (GANs) may also be used. Additional examples of the machine learning model 126 may include perceptron, a feed forward model, a radial basis network (RBF), a deep feed forward model (DFF), a recurrent neural network (RNN), a long short term memory (LSTM) model, a gated recurrent model (GRU), an auto encoder (AE), a variational auto encoder (VAE), a sparse auto encoder (SAE), a denoising auto encoder (DAE), a Markov chain (MC), a hidden Markov model (HMI), a Hopfield network (HN), a Boltzmann machine (BM), a restricted Boltzmann machine (RBM), a deep believe model (DBN), a convolutional neural network (CNN), a Convolutional Inverse Graphics Network (CIGN), a Generative Adversarial Network (GAN), a Liquid State Machine (LSM), an Extreme Learning Machine (ELM), an Echo Network Machine (ENM), a Kohonen Network (KN), a Deep Residual Network (DRN), a Support Vector Machine (SVM), or a Neural Turing Machine (NTM). A machine learning model 126 may be trained to distinguish various signals from different users using one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to predict whether a signal is from the same person, the training samples may be example signals of different people (e.g., facial images of different people). The labels for each training sample may be binary or multi-class. In some cases, an unsupervised learning technique may be used. The samples used in training are not labeled. Various unsupervised learning techniques such as clustering may be used. For example, signals of different people that have no label of people may be clustered together by an unsupervised learning technique. In some cases, the training may be semi-supervised with a training set having a mix of labeled samples and unlabeled samples.

A machine learning model may be associated with an objective function, which generates a metric value that describes the objective goal of the training process. For example, the training may intend to reduce the error rate of the model in generating a vector and/or to distinguish different people. In such a case, the objective function may monitor the error rate of the machine learning model. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the sum of absolute differences between the predicted values and the actual value), L2 loss (e.g., the sum of squared distances). In some embodiments, the loss function is defined in terms of two metrics: margin and threshold.

Figure 3A:
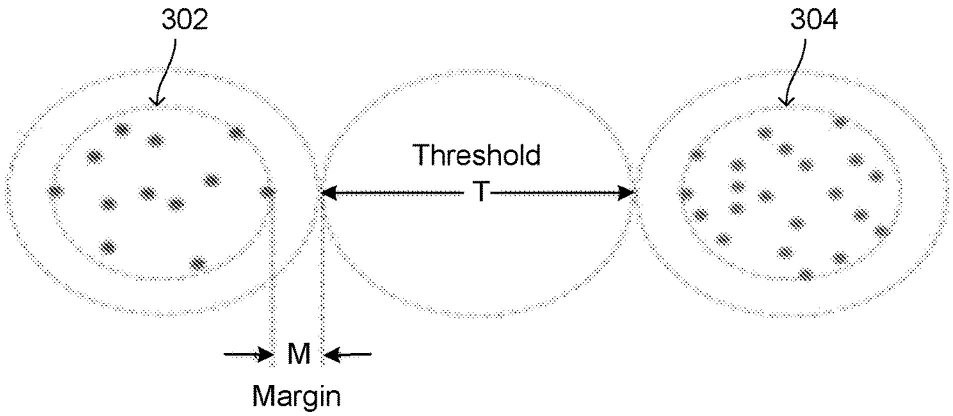
FIG. 3A is a conceptual diagram illustrating the two metrics in the loss function.

FIG. 3A is a conceptual diagram illustrating the two metrics in the loss function. For example, the machine learning model is trained to convert the signals captured by sensors 112 to vectors in a latent space (e.g., a multi-dimensional space). While a 2D vector is illustrated as an example in FIG. 3A, the actual embodiment may include N dimensions. The number of dimensions can be any number and can go up to even a thousand or a million dimensions. Each dot in FIG. 3A represents a vector. The example in FIG. 3A illustrates the vectors of two different people, as represented by clusters 302 and 304. Each cluster of vectors in FIG. 3A corresponds to a person. The loss function is based on the threshold distance T for separating the two people and the margin of error M. In training the machine learning model, the parameters in the machine learning model are adjusted to try to fit the vectors of the same person in the same Euclidean space and to increase the threshold T and margin M. In this way, the machine learning model is trained to cluster together vectors produced by different variations of the user signal from the same user, but separate vectors produced by user signals from different users.

Figure 3B:
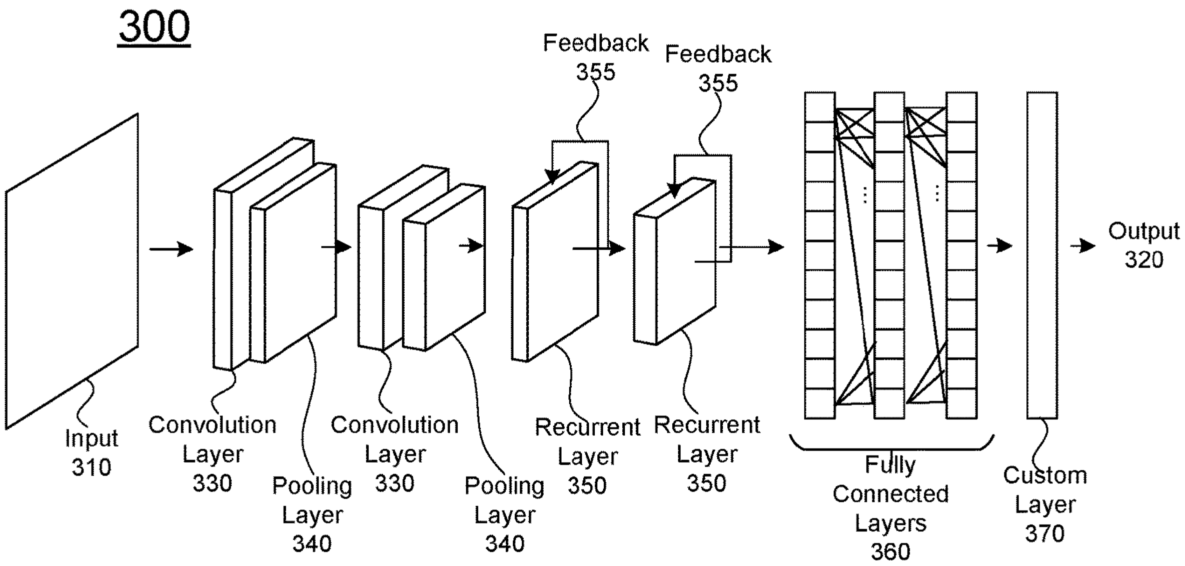
FIG. 3B is a conceptual diagram illustrating an example machine learning model, in accordance with some embodiments.

Referring to FIG. 3B, a structure of an example CNN is illustrated, according to an embodiment. The CNN 300 may be an example of the machine learning model 126. The CNN 300 may receive an input 310 and generate an output 320. The CNN 300 may include different kinds of layers, such as convolutional layers 330, pooling layers 340, recurrent layers 350, full connected layers 360, and custom layers 370. A convolutional layer 330 convolves the input of the layer (e.g., an image) with one or more kernels to generate different types of images that are filtered by the kernels to generate feature maps. Each convolution result may be associated with an activation function. A convolutional layer 330 may be followed by a pooling layer 340 that selects the maximum value (max pooling) or average value (average pooling) from the portion of the input covered by the kernel size. The pooling layer 340 reduces the spatial size of the extracted features. In some embodiments, a pair of convolutional layer 330 and pooling layer 340 may be followed by a recurrent layer 350 that includes one or more feedback loop 355. The feedback 355 may be used to account for spatial relationships of the features in an image or temporal relationships of the objects in the image. The layers 330, 340, and 350 may be followed in multiple fully connected layers 360 that have nodes (represented by squares in FIG. 3B) connected to each other. The fully connected layers 360 may be used for classification and object detection. In one embodiment, one or more custom layers 370 may also be presented for the generation of a specific format of output 320. For example, a custom layer may be used for image segmentation for labeling pixels of an image input with different segment labels. In some embodiments, the CNN used in the machine learning model 126 is a 34-layer CNN that has one or more 7×7 convolution layers, pooling layers, followed by multiple 3×3 convolution layers, pooling layers, and fully connected layers.

The order of layers and the number of layers of the CNN 300 in FIG. 3B is for example only. In various embodiments, a CNN 300 includes one or more convolutional layer 330 but may or may not include any pooling layer 340 or recurrent layer 350. If a pooling layer 340 is present, not all convolutional layers 330 are always followed by a pooling layer 340. A recurrent layer may also be positioned differently at other locations of the CNN. For each convolutional layer 330, the sizes of kernels (e.g., 3×3, 5×5, 7×7, etc.) and the numbers of kernels allowed to be learned may be different from other convolutional layers 330.

A machine learning model may include certain layers, nodes, kernels and/or coefficients. Training of a neural network may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be iteratively performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

Figure 4:
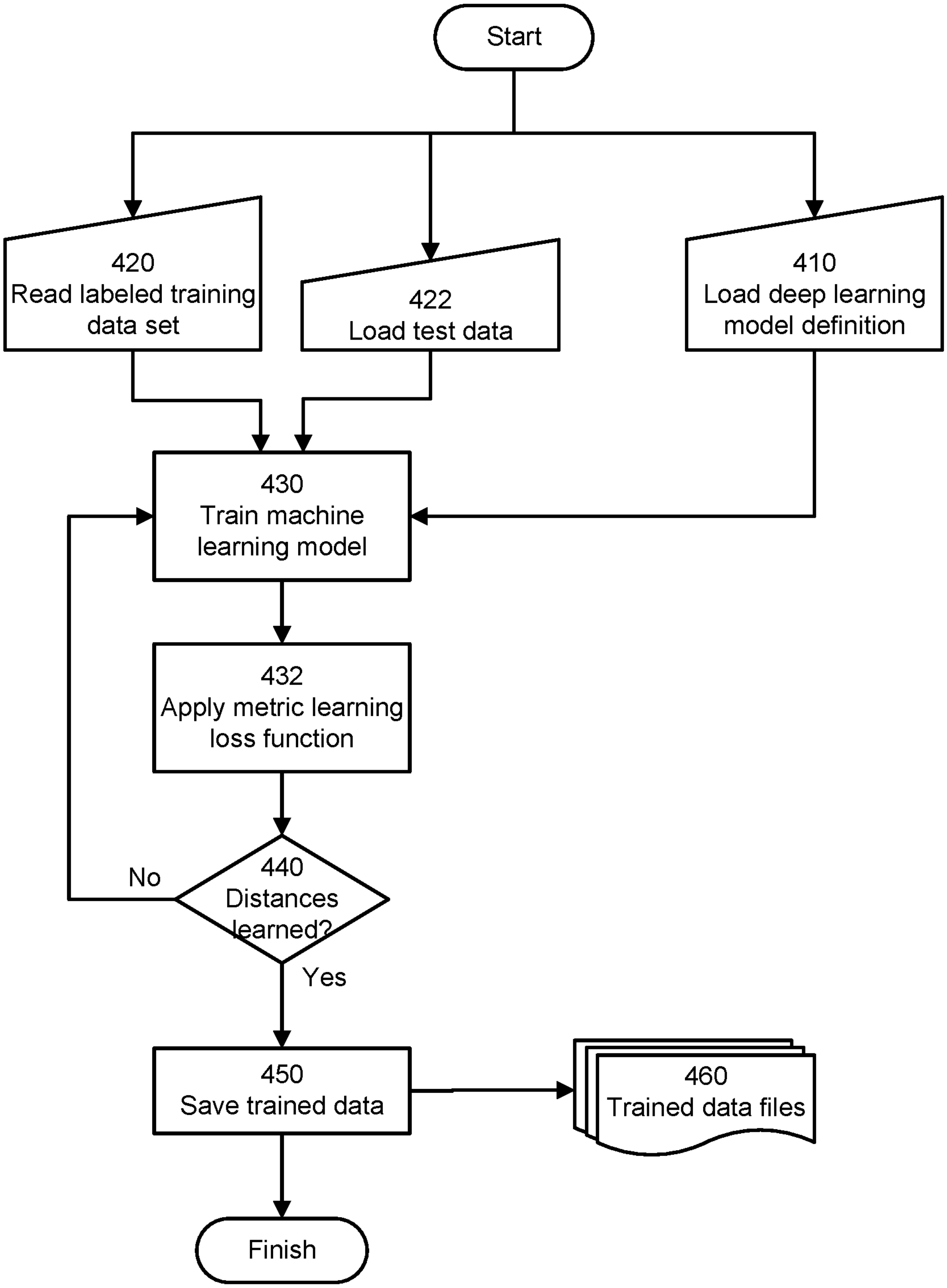
FIG. 4 is a flowchart depicting an example process for training a machine learning model, in accordance with some embodiments.
Figure 5A:
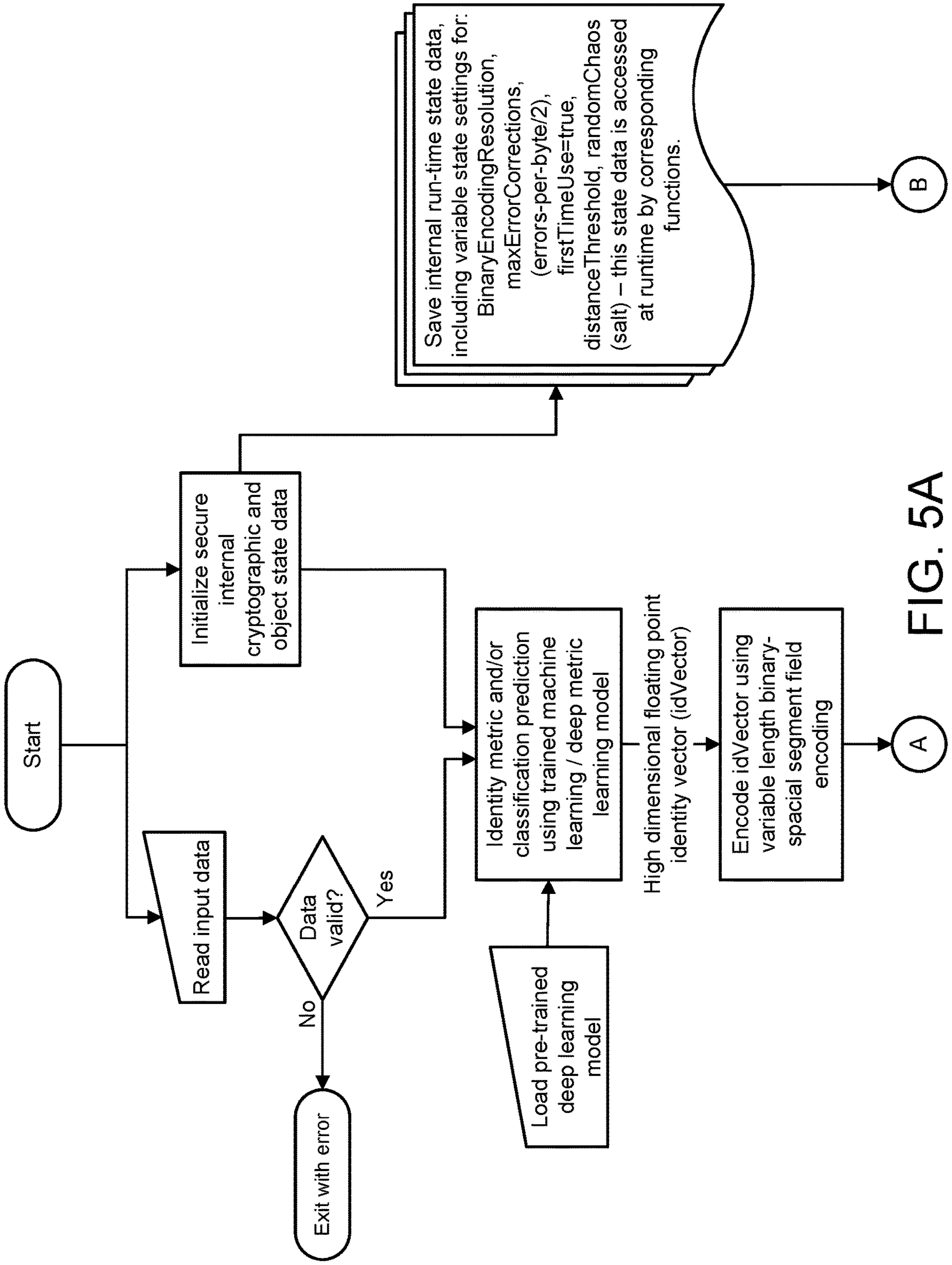
FIGS. 5A-5D, combined, is a flowchart depicting an example process for generating a cryptographic key for a first time user who has never input data before to a machine learning model, in accordance with some embodiments.
Figure 5B:
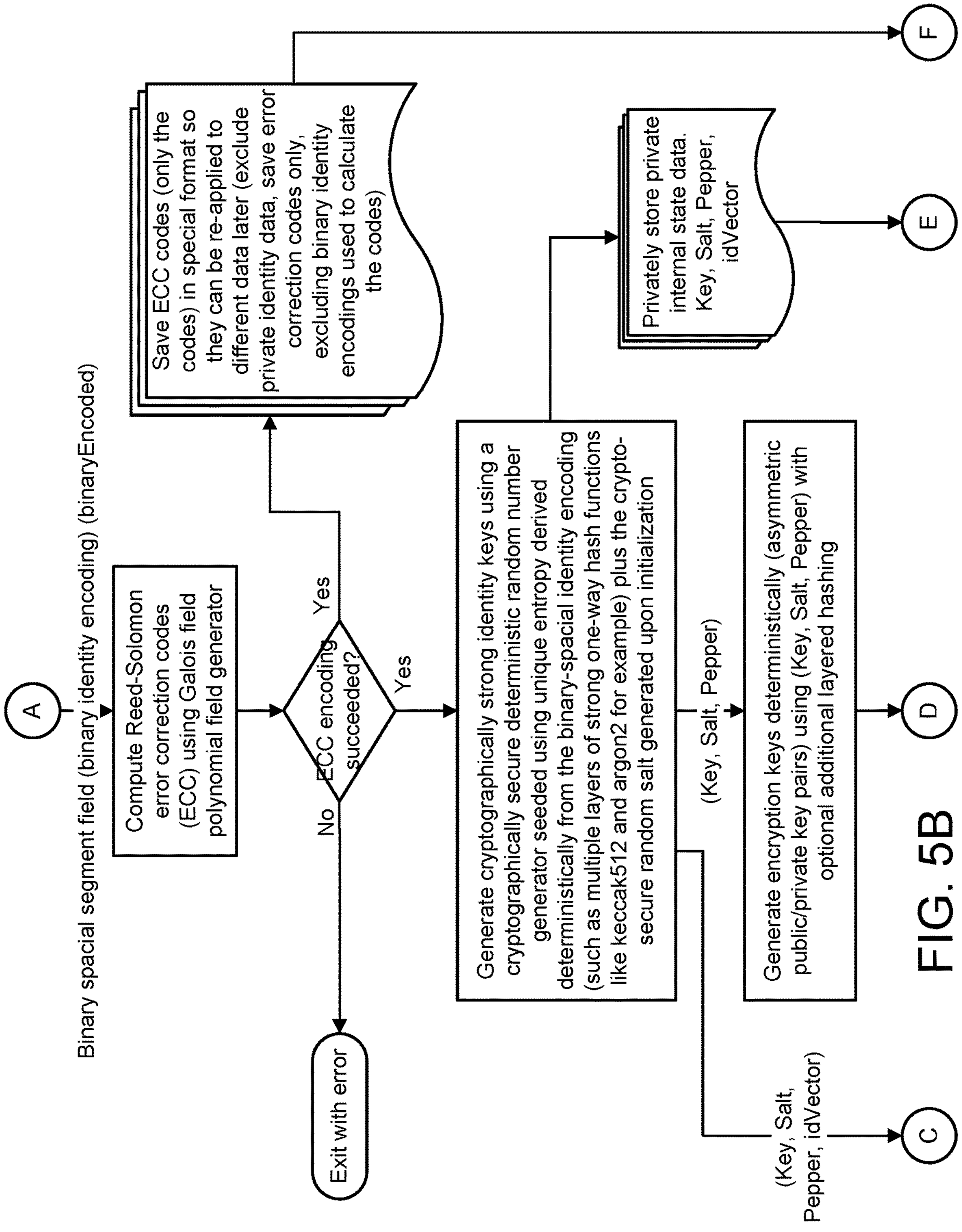
Figure 5C:
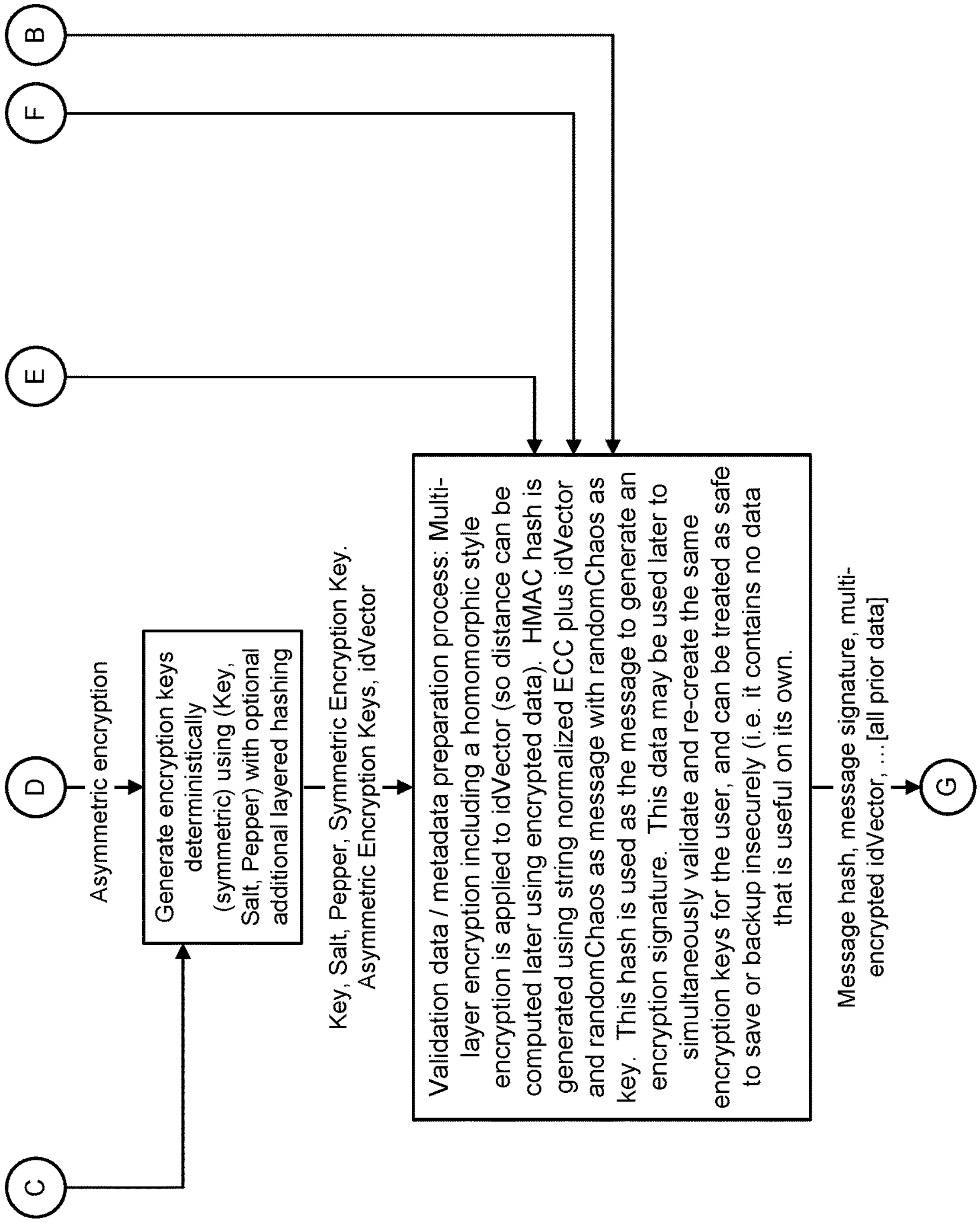
Figure 5D:
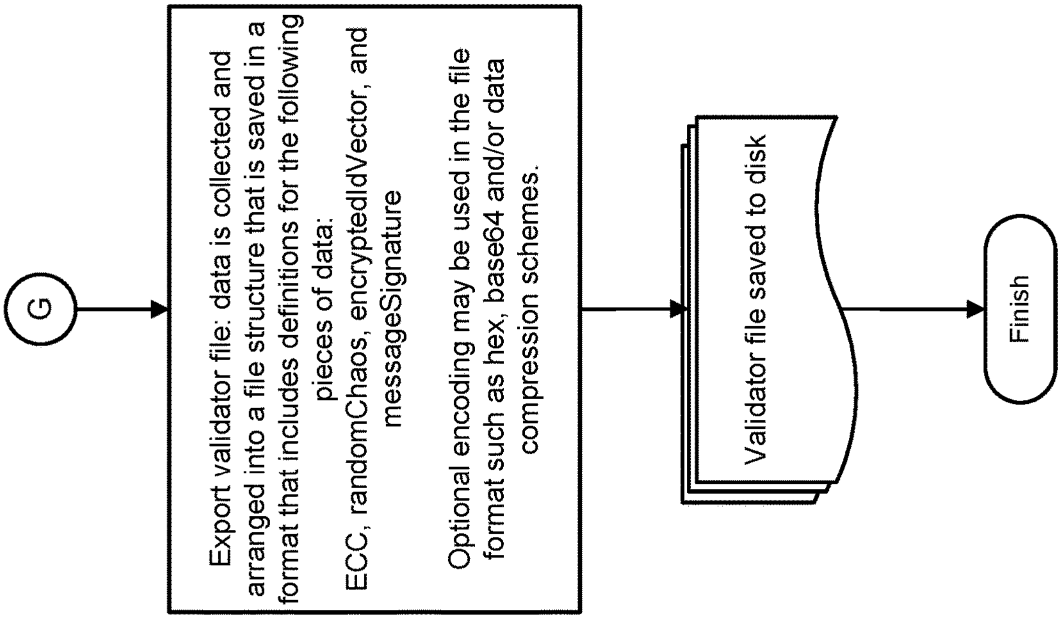

FIG. 4 is a flowchart depicting an example process for training a machine learning model, in accordance with some embodiments. The machine learning model may be trained by a user device 110 or pre-trained by a server, such as the access control server 130. For example, a computing device may load 410 deep learning model definitions such as the number of layers, the structure of the layers, the size of kernels in each layers, and various initial values of parameters. The computing device may also read 420 labeled training data set with classifications and load 422 test data. In turn, the computing device trains 430 the machine learning model in batches or mini-batches (pairs, triplets, etc.). The computing device may apply 432 metric learning loss function that uses threshold and margin as the loss function criteria, as shown in FIG. 3A. The computing device may determine 440 whether the distances and the results are learned. If not, additional iterations of training are applied. After the machine learning model is sufficient trained, the computing device saves 450 the training data as data files 460.

FIG. 5A-5D, combined, is a flowchart depicting an example process for generating a cryptographic key for a first time user whose data has not been previously input to a machine learning model, in accordance with some embodiments. The flowchart is broken into four figures and the connection points in the flowchart are illustrated with letters in circles. The process may be used, for example, the first time an account is signed up. The process may be an example of process 200 illustrated in FIG. 2.

Figure 6A:
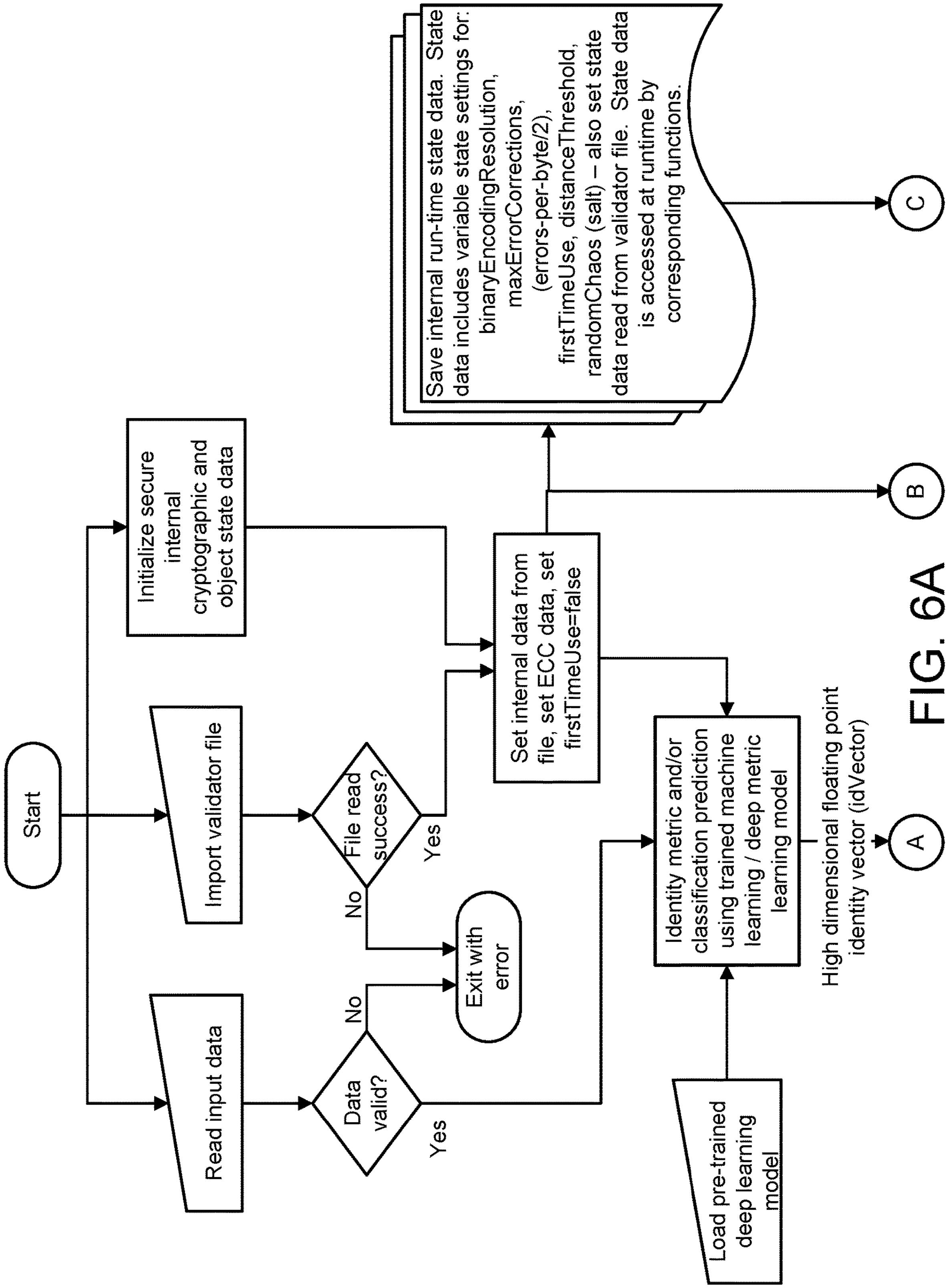
FIGS. 6A-6C, combined, is a flowchart depicting an example process for generating a cryptographic key for a returned user who has input identity data, in accordance with some embodiments.
Figure 6B:
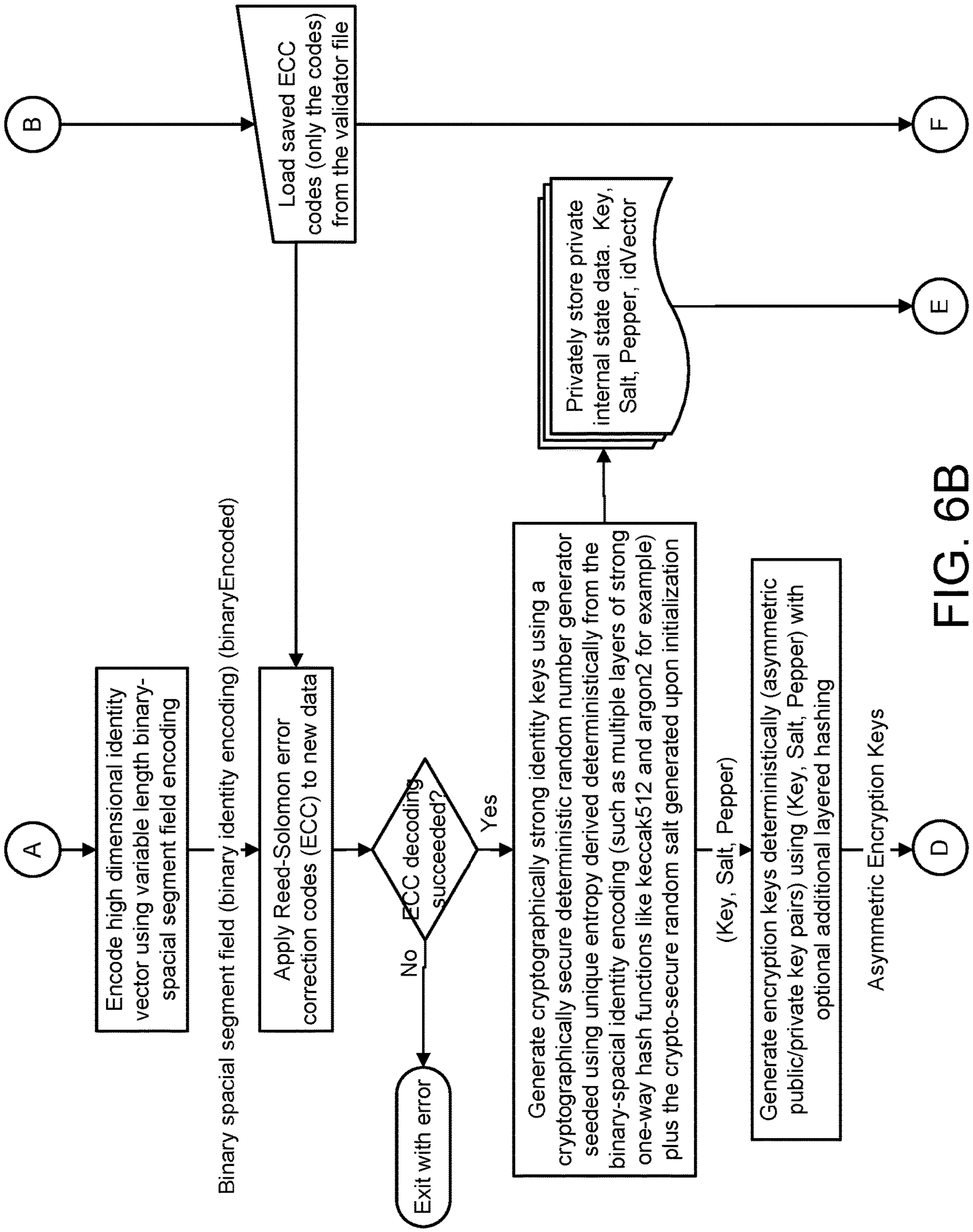
Figure 6C:
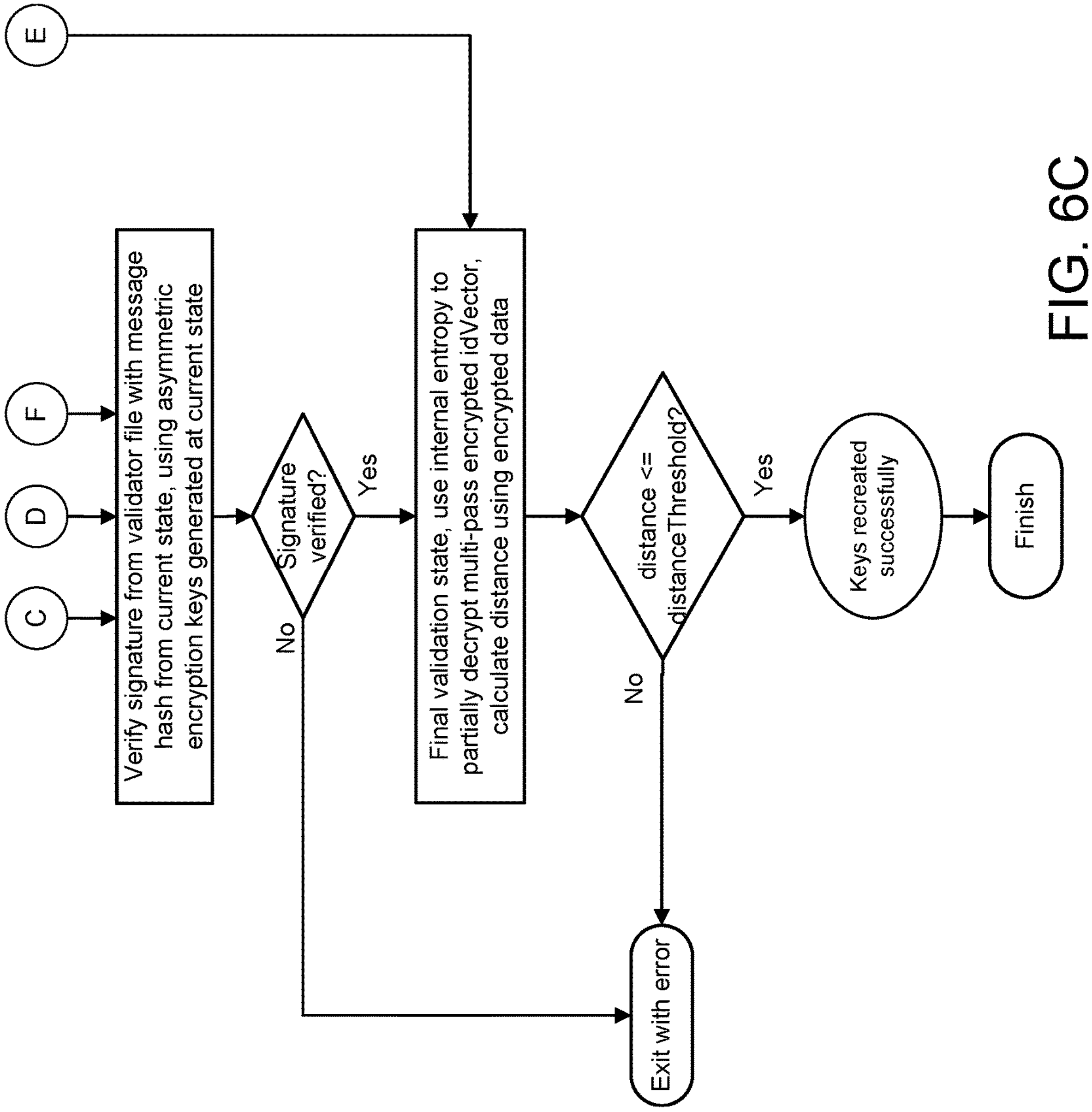

FIG. 6A-6C, combined, is a flowchart depicting an example process for generating a cryptographic key for a returning user who has previously input identity data, in accordance with some embodiments. The flowchart is broken into three figures and the connection points in the flowchart are illustrated with letters in circles. The process may be used, for example, when the user has already signed up an account and has now returned for authentication. The process may be an example of process 200 illustrated in FIG. 2.

In some embodiments, a vector extracted from the machine learning model 126 may be encoded. Below is a description of an example of an encoding scheme. In various embodiments, other encoding schemes may also be used.

When using a machine learning model, encoding may be used to that the high dimensional floating point identity vector which is output from the machine learning model may be utilized to create a reliably reproducible cryptographically strong high-entropy digital key. In addition, machine learning models typically output numbers that are not suitable for use directly for cryptography for a number of reasons. Most notably, the outputs of the machine learning models, in the final outputs or in values extracted from a hidden layer, have imperfect floating point nature. Cryptographic algorithms typically use integer numbers, and ideally, very high entropy binary sequences.

An encoding scheme referred to as binary spatial segment fields is described below to address this. This encoding scheme is similar in concept to the idea of "one-hot" feature vectors used in machine learning. However, the numerical classification is applied in the radix space of each individual floating point digit, concatenated to create the final binary representation of the floating point number. In some embodiments, the binary spatial segment field encoded results are able to have error correction computed and saved using a polynomial space Galois field. Together, the specific method of encoding with the use of error correction enables the use of a deep metric trained machine learning model within the cryptographic system. For example, different floating point identity vectors for the same person will be mapped to different binary representations, but these representations may be close enough that error correction techniques map them to the same seed for generating a cryptographic key for the user.

In some embodiments, the density of the binary field (how many zeros and ones represent a single digit, and how many zeros and ones represent the entire floating point number), as well as the variation in which all zeros define the beginning of the space (does the start of the space begin at negative one, or another digit?) and where all ones define the end of the space (the upper limit) are all variables input into the encoding system, and are determined by the algorithm dynamically at run-time. The following examples are for the purpose of explaining the encoding scheme, but are not to be taken literally as to represent any sort of limits for the dimensionality of the binary field nor should the range definitions of −1 to 1 be taken literally. These are all variable states that the encoder can change based on differing numerical inputs to the system.

Given a floating point number of radix ten (base 10) with each single digit allowed a normalized range between −1 and +1, with a decimal precision up to 16 digits (e.g., the number 0.12345678911121416), the minimum and maximum of each individual component of the floating point number can be described as shown in Table 1.

TABLE 1

Individual components of floating point numbers

| | | | |
|---|---|---|---|
| First | −1.0 | All | |
| digits | −0.9 | remaining | −0.9 |
| between | −0.8 | digits / | −0.8 |
| −1 to 1: | −0.7 | decimal | −0.7 |
| | −0.6 | places: | −0.6 |
| | −0.5 | | −0.5 |
| | −0.4 | | −0.4 |
| | −0.3 | | −0.3 |
| | −0.2 | | −0.2 |
| | −0.1 | | −0.1 |
| | 0.0 | | 0.0 |
| | 0.1 | | 0.1 |
| | 0.2 | | 0.2 |
| | 0.3 | | 0.3 |
| | 0.4 | | 0.4 |
| | 0.5 | | 0.5 |
| | 0.6 | | 0.6 |
| | 0.7 | | 0.7 |
| | 0.8 | | 0.8 |
| | 0.9 | | 0.9 |
| | 1.0 | | |

From this, single digit binary encodings can be calculated. In the encoding, the Hamming distance may act as an analogous heuristic substitute for the real distances (cosine distance, Euclidean distance, non-linear or otherwise) previously learned in the machine learning model. Therefore, encode the floating point numbers so that their signed distances are represented as shown in Table 2.

TABLE 2

Binary encoding of floating point numbers

| Floating point | Binary encoding | Floating point | Binary encoding |
|---|---|---|---|
| −1.0 | 00000000000000000000 | 0.0 | 0000000000 |
| −0.9 | 00000000000000000001 | 0.1 | 0000000001 |
| −0.8 | 00000000000000000011 | 0.2 | 0000000011 |
| −0.7 | 00000000000000000111 | 0.3 | 0000000111 |
| −0.6 | 00000000000000001111 | 0.4 | 0000001111 |
| −0.5 | 00000000000000011111 | 0.5 | 0000011111 |
| −0.4 | 00000000000000111111 | 0.6 | 0000111111 |
| −0.3 | 00000000000001111111 | 0.7 | 0001111111 |
| −0.2 | 00000000000011111111 | 0.8 | 0011111111 |
| −0.1 | 00000000000111111111 | 0.9 | 0111111111 |
| 0.0 | 00000000001111111111 | 1.0 | 1111111111 |
| 0.1 | 00000000011111111111 | | |
| 0.2 | 00000000111111111111 | | |
| 0.3 | 00000001111111111111 | | |
| 0.4 | 00000011111111111111 | | |
| 0.5 | 00000111111111111111 | | |
| 0.6 | 00001111111111111111 | | |
| 0.7 | 00011111111111111111 | | |
| 0.8 | 00111111111111111111 | | |
| 0.9 | 01111111111111111111 | | |
| 1.0 | 11111111111111111111 | | |

Single digit binary encodings for each numeric decimal place of the floating point number can then be calculated. For each number, the floating point number is represented as a binary encoding following the general rule that the smallest number be encoded with all zeros, and the largest number be encoded with all ones. This is done for each number of the floating point number, one at a time, each time storing in memory a new version of the number, where each radix integer value of the floating point number is replaced with its binary encoded equivalent, as shown in Table 3.

TABLE 3

Binary encoding of floating point numbers

| Floating point | Binary encoding |
|---|---|
| −0.9 | 00000000000000000001 |
| −0.8 | 00000000000000000011 |
| −0.7 | 00000000000000000111 |
| −0.6 | 00000000000000001111 |
| −0.5 | 00000000000000011111 |
| −0.4 | 00000000000000111111 |
| −0.3 | 00000000000001111111 |
| −0.2 | 00000000000011111111 |
| −0.1 | 00000000000111111111 |
| 0.0 | 00000000001111111111 |
| 0.1 | 00000000011111111111 |
| 0.2 | 00000000111111111111 |
| 0.3 | 00000001111111111111 |
| 0.4 | 00000011111111111111 |
| 0.5 | 00000111111111111111 |
| 0.6 | 00001111111111111111 |
| 0.7 | 00011111111111111111 |
| 0.8 | 00111111111111111111 |
| 0.9 | 01111111111111111111 |

For example, the number 0.1234 would result in the following binary encoding. The sequence in Table 4 illustrates how the binary encoded version of the number substitutes for the floating point version.

TABLE 4

| Example binary encoding of 0.1234 | | | |
|---|---|---|---|
| Digit 1 of | 0.1234 | encoded as | 0000000001111111111 |
| Digit 2 of | 0.1234 | encoded as | 0000000011111111111 |
| Digit 3 of | 0.1234 | encoded as | 0000000111111111111 |
| Digit 4 of | 0.1234 | encoded as | 0000001111111111111 |

The encoding of the floating point number is completed when all of its floating point digits have been replaced with their binary equivalents, such that all numbers of the floating point's precision have been substituted with binary representations. In the above encoding, the floating point number 0.1234 would be encoded as: 00000000011111-11111100000000111111111111100000001111111111111000-00011111111111 11

This process is run on all floating point numbers of the high-dimensional floating point vector. This results in a large slot expansion (number of addresses required to represent the number), but due to the simplification down to binary, it also results in a near-exact dimensionality equivalence representation for the binary encoded numbers.

Figure 7A:
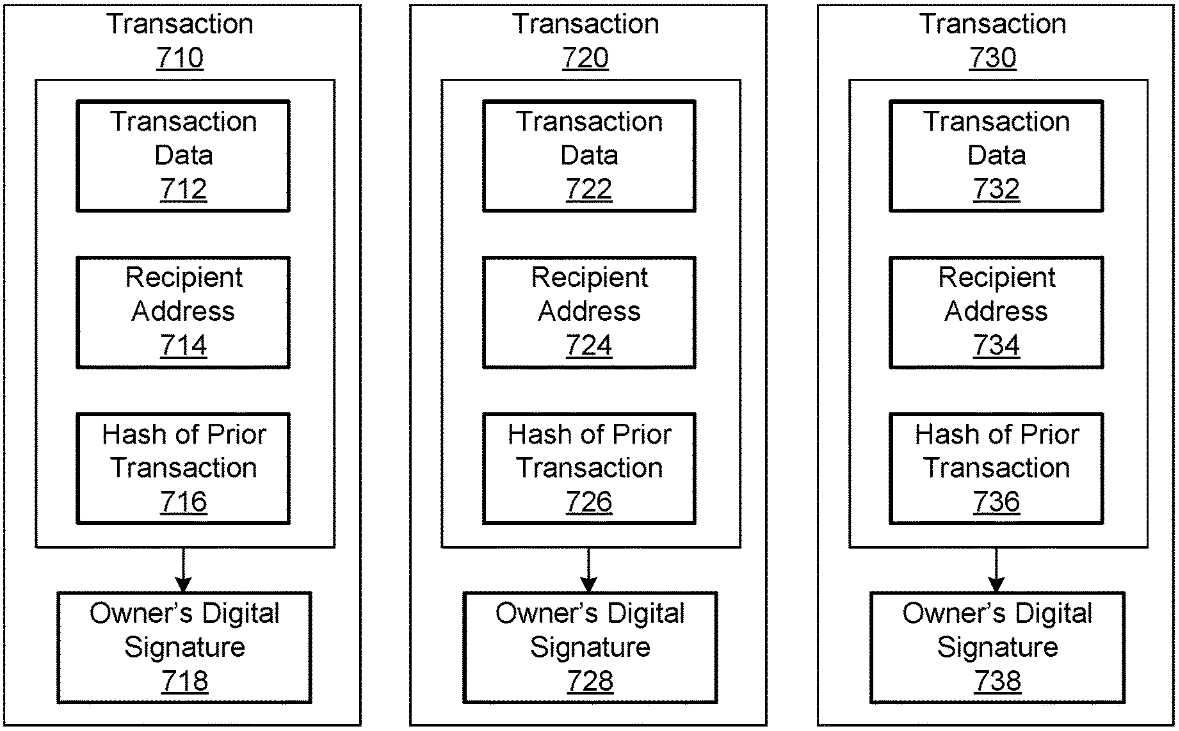
FIG. 7A is a block diagram illustrating a chain of transactions broadcasted and recorded on a blockchain, in accordance with an embodiment.

FIG. 7A is a block diagram illustrating a chain of transactions broadcasted and recorded on a blockchain, in accordance with an embodiment. The transactions described in FIG. 7A may correspond to various types of transactions and transfers of blockchain-based units using cryptographic keys described in previous figures.

In some embodiment, a blockchain is a distributed system. A distributed blockchain network may include a plurality of nodes. Each node is a user or a server that participates in the blockchain network. In a public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a private cryptographic key that is used to sign transactions and prove the ownership of a blockchain-based unit.

The ownership of a blockchain-based unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract or a mining process and may be traced back to the smart contract that is recorded on the blockchain or the first block in which it was generated. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block.

In some embodiments, account model is used and transactions do not have any references to previous transactions. Transactions are not chained and do not contain the hash of the previous transaction.

Referring to one of the transactions in FIG. 7A, for illustration, the transaction 720 may be referred to as a current transaction. Transaction 710 may be referred to as a prior transaction and transaction 730 may be referred to as a subsequent transaction. Each transaction **7*0** (where *=1, 2 or 3) includes transaction data **7*2, a recipient address 7*4, a hash of the prior transaction 7*6, and the current transaction's owner's digital signature 7*8**.

In this example, the transaction data 722 records the substance of the current transaction 720. For example, the transaction data 722 may specify a transfer of a quantity of a blockchain-based unit (e.g., a coin, a blockchain token, etc.). In some embodiments, the transaction data 722 may include code instructions of a smart contract.

The recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, encoding the resultant bits, and truncating the address. The recipient address 724 may be a unique identifier of the digital wallet of the recipient on the blockchain.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain-based unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain-based unit is fixed by the recipient address 724. In other words, the subsequent owner that generates the digital signature 738 in the subsequent transaction 730 is fixed by the recipients address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728. Hence, a current owner who has the blockchain-based unit tied to the owner's blockchain address can prove the ownership of the blockchain-based unit. It can be described as the blockchain-based unit being connected to a public cryptographic key of a party because the blockchain address is derived from the public key.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

Figure 7B:
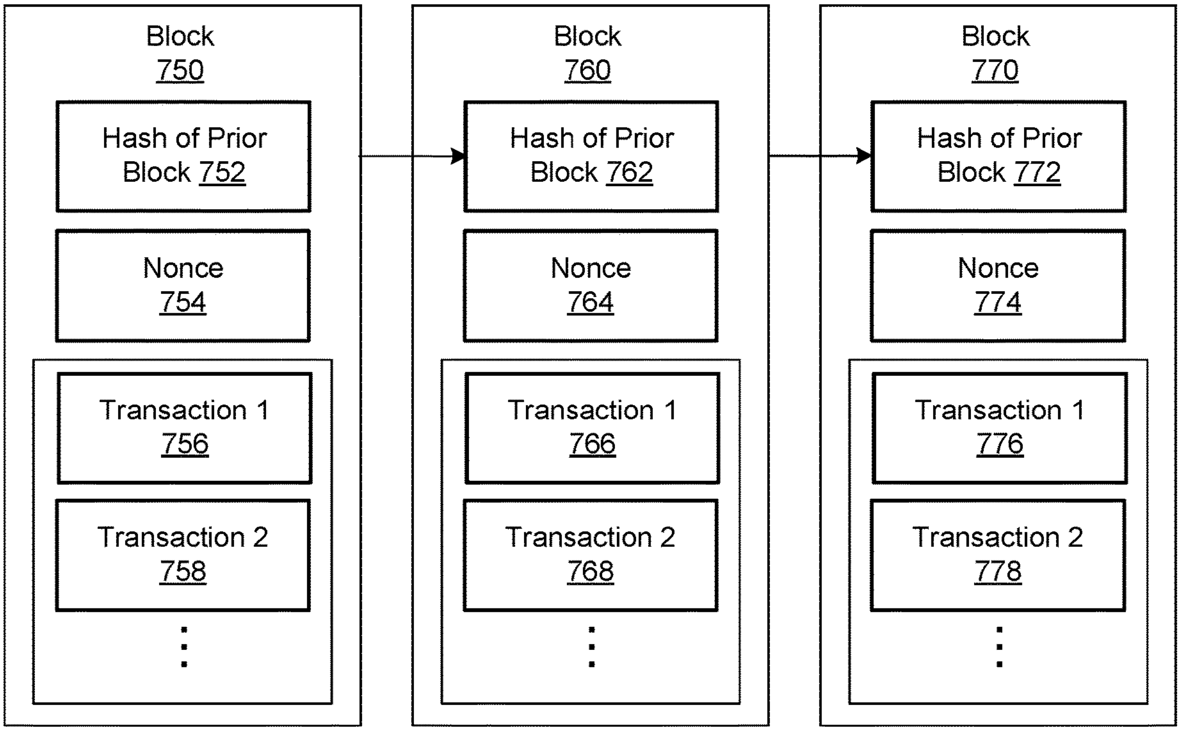
FIG. 7B is a block diagram illustrating a connection of multiple blocks in a blockchain, in accordance with an embodiment.

FIG. 7B is a block diagram illustrating a connection of multiple blocks in a blockchain, in accordance with an embodiment. Each block of a blockchain, except the very first block which may be referred to as the genesis block, may have a similar structure. The blocks **7*x*0 (where x=5, 6 or 7) may each include a hash of the prior blockchain 7*x*2, a nonce 7*x*4, and a plurality of transactions (e.g., a first transaction 7*x*6, a second transaction 7*x*8, etc.). Each transaction may have the structure shown in FIG. 7**A.

In a block generation process, a new block may be generated through mining or voting. For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. When there are multiple candidates new blocks that include different transactions are available, the nodes will vote for one of the blocks to be linked to the existing block. The voting may be based on the voting power of the nodes.

By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes find a hash that satisfies the criteria. The nonce that is used to generate the satisfactory hash is the nonce 764. The node that first generates the hash 762 may also select what transactions that are broadcasted to the blockchain network are to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiment, the transaction is considered settled when the transaction is considered final. A transaction is considered final when there are multiple subsequent blocks generated and linked to the block that records the transaction.

In some embodiments, some of the transactions 756, 758, 766, 768, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Figure 8:
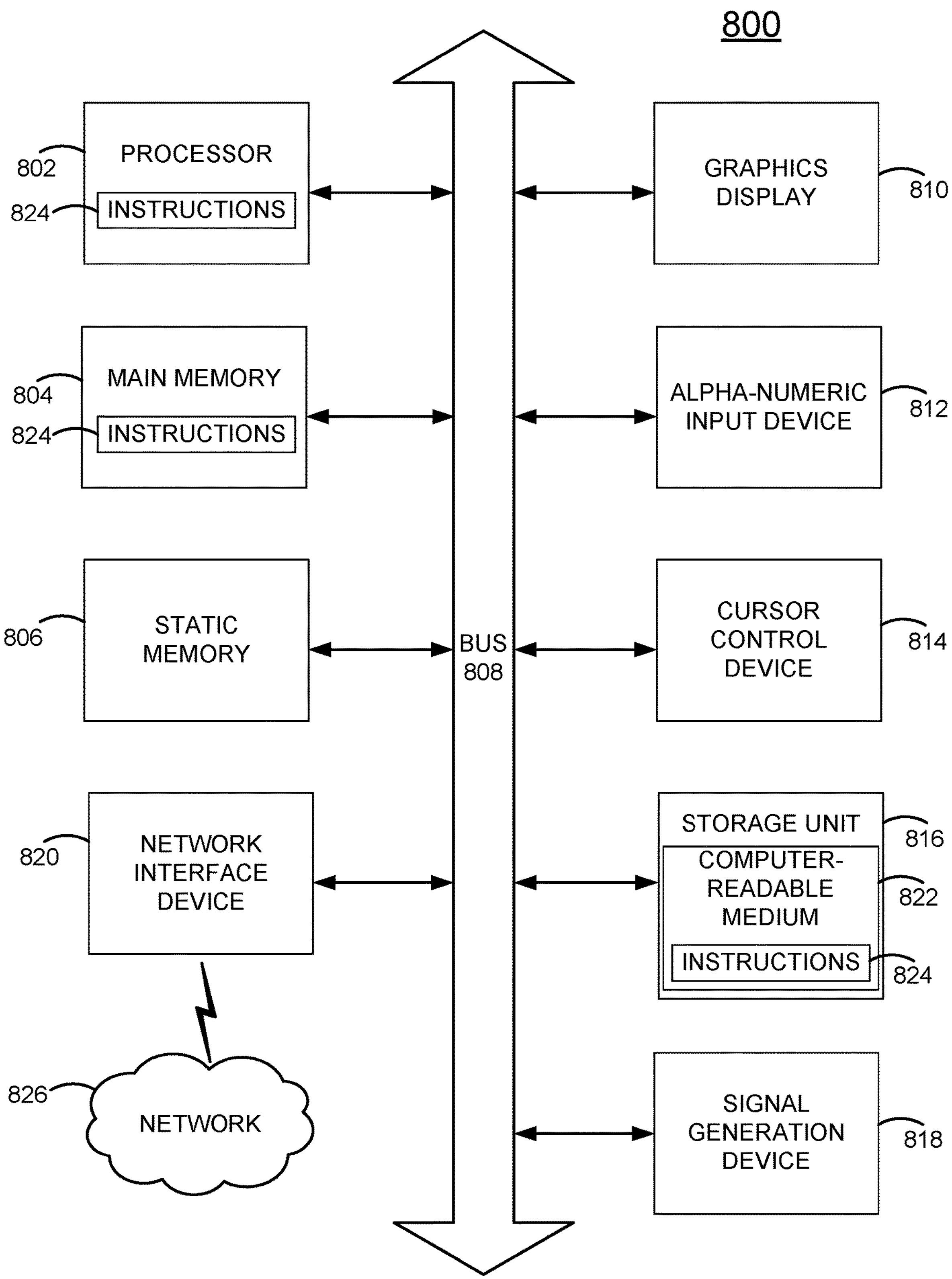
FIG. 8 is a block diagram illustrating components of an example computing machine that is capable of reading instructions from a computer-readable medium and execute them in a processor.

FIG. 8 is a block diagram illustrating components of an example computing machine that is capable of reading instructions from a computer-readable medium and execute them in a processor. A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIG. 1, including but not limited to, the user device 110, the application publisher server 120, the access control server 130, a node of a blockchain network, and various engines, modules interfaces, terminals, and machines in various figures. While FIG. 8 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alpha-numeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

ADDITIONAL CONSIDERATIONS AND APPLICATIONS

The modern digital landscape is a vast interconnected web where individuals, organizations, and devices constantly interact. Central to these interactions is the concept of a digital identity, which plays a pivotal role in ensuring trust, security, and seamless user experiences. Digital identity can be one of the most important and invaluable applications. The various embodiments of example systems described herein can be used to represent digital identity cryptographically and in a way that is robust, secure, zero-knowledge and self sovereign. The digital identity representation has attributes that enable a zero-knowledge system because the method that verifies the identity does not require the knowledge of the user's actual identity, only that the identity has been verified and can be trusted, therefore a zero-knowledge digital identity system that is robust can be built using our methods. The digital identity can even in theory be represented by machine learned vector representations of external objects that are not a result of the direct sensor capture of the human themselves, such a series of unique objects, further enabling a layer of privacy that simple biometric systems lack.

A breakthrough in representing digital identity that combines machine learning with cryptographic methods, has the potential to revolutionize numerous sectors, from personal identification and authentication to civil infrastructure. In today's current day and age, people typically only have self sovereign control over things like their passwords—and those remain scattered and fragmented across a multitude of often-times insecure and breached centralized servers. Various example systems described herein enable the elimination of fragmented and antiquated "password" based authentication systems and gives the user direct access to control all authentication using a cryptographically secure method with their own self sovereign identity.

In addition, there are broad applications towards a robust solution to the sybil problem found in decentralized networks like blockchains.

Below are some examples applications and use cases for using the example systems described in this disclosure. Claims may be directed to applying various embodiments described in this disclosure to one or more applications below. For simplicity, the technical details are not repeated but each application below fully incorporates the technical detail described above.

1. Personal Identification and Authentication

Online Services: From social media accounts to email services, a secure digital identity can streamline the login process while bolstering security.

Banking and Financial Services: Online banking, stock trading, and other financial transactions require a robust level of security. A sovereign digital identity would greatly reduce the risk of fraud.

E-commerce: Reliable digital identity can expedite the checkout process and reduce fraudulent transactions.

2. Healthcare

Electronic Health Records: Patients can securely access and control their medical records.

Telemedicine: Ensuring that patients and healthcare providers are who they claim to be during remote consultations.

3. Government and Public Services

E-Governance: Streamlining interactions with government agencies, including filing taxes, licensing, and permit applications.

Voting: Digital identity can revolutionize online voting systems, making them more secure and accessible.

4. Education

Online Learning: Authenticating students during online exams and digital course enrollments.

School Systems: Streamlining administrative processes and ensuring the right access for students, staff, and faculty.

5. Enterprise and Business

Employee Access: Simplifying access to company resources, including physical premises and digital assets.

Customer Relationship Management (CRM): Enhancing customer interactions through secure and personalized experiences.

6. Smart Cities and Infrastructure

Utilities Management: Simplifying the process for individuals to access and control their utilities.

Public Transport: Enabling seamless ticketing systems and access controls.

7. Internet of Things (IoT)

Device Management: Authenticating and managing devices in smart homes, offices, and factories.

Vehicle Identity: In the age of autonomous vehicles, ensuring the right vehicle accesses the right services and routes.

8. Travel and Hospitality

Immigration and Border Control: Accelerating the immigration process while ensuring stringent security.

Hotel and Accommodation: Streamlining check-in processes and personalizing guest experiences.

9. Entertainment

Online Gaming: Authenticating players, enabling in-game purchases, and safeguarding player profiles.

Digital Media Access: Ensuring the right subscribers access the content they're entitled to.

10. Blockchain and Cryptocurrency

Solving the Sybil problem inherent in all current modern day blockchains (more on that in later section)

Wallet Security: Authenticating transactions and ensuring the security of digital assets.

Smart Contracts: Facilitating automated agreements by ensuring parties involved are properly identified.

11. Research and Academia

Scientific Collaboration: Ensuring secure access to shared datasets and research tools.

Academic Publishing: Authenticating authors and reviewers in the publication process.

12. Supply Chain and Logistics

Product Authenticity: Ensuring the originality of products, which is critical in sectors like pharmaceuticals.

Secure Trade: Streamlining customs processes while ensuring that goods are correctly identified and accounted for.

13. Real Estate

Digital Transactions: Facilitating property sales and rentals with secure digital contracts and authenticated parties.

Property Management: Allowing residents and owners secure access to buildings and community resources.

14. Emergency Services

Disaster Response: Quickly and reliably identifying individuals in emergencies, crucial for targeted relief efforts.

Medical Emergencies: Authenticating medical personnel and granting them quick access to resources.

The applications are vast and varied. Whether it's ensuring a patient's privacy, streamlining business processes, or facilitating democratic voting systems, use of cryptographic methods that use machine learning to create a trustworthy self sovereign digital identity is paramount. An innovation that allows for secure, reliable, and sovereign digital identities can drive a new era of digital trust, reduce fraud, and enable seamless experiences across the digital realm.

Perhaps one interesting and exciting area that would be transformed by various embodiments described herein is in the area of decentralized systems, since decentralized networks also have broad mainstream applications across most if not all of the previously mentioned areas. In particular, is the application of digital identity towards a complete robust solution for the Sybil problem—which itself has many direct benefits, among them enabling the feasible deployment of a global, decentralized universal basic income finance system.

Decentralized Systems and Solving the Sybil Problem

The Sybil attack, where a single adversary can create many identities (often referred to as Sybil nodes) to subvert the system, is a significant hurdle in decentralized systems. A robust solution that uses cryptographic keys securely derived from machine learning data to create a novel robust digital identity solution can be used to effectively prevent Sybil attacks—which would have transformative effects across numerous areas:

1. Decentralized Content Networks

Trustworthiness: Users can trust that interactions are genuine, enhancing the quality of connections.

Content Authenticity: Reduces the proliferation of fake news, malicious bots, and spam by verifying the source's identity.

2. Decentralized Marketplaces

Reputation Systems: Sellers and buyers have genuine ratings, leading to a more trustworthy marketplace.

Transaction Authenticity: Ensures that all participants in a transaction are genuine, reducing scams.

3. Peer-to-Peer Networks

Resource Sharing: With genuine identity verification, resources like bandwidth or storage can be shared more confidently.

Network Health: Reduces malicious nodes, ensuring a healthier, more resilient network.

4. Decentralized Autonomous Organizations (DAOs)

Voting: DAO decision-making processes are enhanced as votes come from genuine members, maintaining the true essence of decentralization.

Membership: Ensures genuine participation in DAOs, fostering trust among members.

5. Decentralized Finance (DeFi)

Loan Systems: Reduces the risk in peer-to-peer lending platforms as borrowers' identities are verified.

Insurance: Claims can be more efficiently processed with genuine identity verification, reducing fraud.

6. Blockchain and Cryptocurrencies

Consensus Mechanisms: Reduces the risk of attacks like the "51% attack" as malicious entities can't easily replicate identities to gain majority control.

Validator Authenticity: Ensures that validators in proof-of-stake systems are genuine, enhancing security.

Implications for Universal Basic Income (UBI)

A trustworthy digital identity as we have described that solves the sybil problem has profound implications enabling systems like UBI:

Verifiable Recipients: Ensures that the intended recipients are genuine, eliminating duplicates or fraudulent beneficiaries.

Efficient Distribution: Streamlines the process of distributing funds, as the identity and the related financial details are securely linked.

Transparency and Accountability: Governments or organizations can transparently demonstrate UBI distribution, and citizens can verify receipt.

Cross-Border UBI: As digital identity becomes global, the concept of UBI can expand across borders, aiding global citizens regardless of their geographic location.

In essence, a robust solution to the digital identity problem, especially one that addresses the Sybil issue, can act as a keystone in the arch of decentralized systems. Not only does it unlock numerous applications by ensuring trustworthiness and security, but it also holds the potential to reshape societal structures through mechanisms like UBI. Such an advancement could be foundational for building our decentralized future.

Beneficially, with various embodiments described in this disclosure, in a cryptographically proofed, cost-efficient way, smart contract (or other Web3 application) owners could add an interface to their applications to have control over the applications after being deployed to the blockchain. In addition, the application publishers could also apply security technologies to control the applications in real-time. Since the interactions would be vetted and signed by the access control system before the interaction request reaches the application on the blockchain, the access control server can block and prevent malicious or unwanted actions.

Certain embodiments are described herein as including logic or a number of components, engines, modules, or mechanisms. Engines may constitute either software modules (e.g., code embodied on a computer-readable medium)

or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method for generating a cryptographic key for a user, the method comprising:

receiving a user signal associated with a biometric of the user;

inputting, to a machine learning model, the user signal associated with the user;

extracting a vector from one or more outputs of one or more layers of the machine learning model, wherein the vector is an embedding vector extracted from a latent space of the machine learning model, wherein the machine learning model is trained to separate different signals from different people in training samples; and generating a cryptographic key from the embedding vector, wherein generating the cryptographic key comprises:

encoding the embedding vector into a binary spatial segment field representation in which Hamming distance between binary spatial segment field representations approximates distance between corresponding embedding vectors in a learned vector space;

applying a Reed Solomon error correction encoding scheme to the binary spatial segment field representation;

generating, based on the Reed Solomon error correction encoding scheme, a seed for the cryptographic key; and generating the cryptographic key based on the seed, wherein subsequent measurements of biometric signals of the user result in additional embedding vectors that, when encoded into additional binary spatial segment field representations, are correctable by the Reed Solomon error correction encoding scheme to re-generate the seed.

2. The computer-implemented method of claim 1 wherein the same cryptographic key is generated for different vectors produced by different variations of the user signal from the same user, and different cryptographic keys are generated for different users.

3. The computer-implemented method of claim 1 wherein the machine learning model operates to cluster together vectors produced by different variations of the user signal from the same user.

4. The computer-implemented method of claim 3 wherein the machine learning model operates to separate vectors produced by user signals from different users.

5. The computer-implemented method of claim 3 wherein the machine learning model is trained using a loss function that increases a separation between vectors produced by user signals from different users.

6. The computer-implemented method of claim 1 wherein generating the cryptographic key from the embedding vector comprises:

mapping the embedding vector to the seed, wherein different vectors produced by different variations of the user signal from the same user are mapped to the same seed, and vectors produced by user signals from different users are mapped to different seeds; and generating the cryptographic key from the seed.

7. The computer-implemented method of claim 6 wherein mapping the embedding vector to the seed comprises:

encoding the embedding vector into a binary spatial segment field representation; and applying error correction to the binary spatial segment field representation.

8. The computer-implemented method of claim 6 wherein mapping the embedding vector to the seed comprises:

encoding the one or more outputs as binary representations;

creating the embedding vector as a concatenation of the binary representations; and applying error correction to the binary representations of the embedding vector.

9. The computer-implemented method of claim 1 wherein generating the cryptographic key from the embedding vector further comprises:

encoding the embedding vector into a binary spatial segment field representation;

applying error correction to the binary spatial segment field representation to produce the seed;
applying the seed as input to a random number generated to generate an identity key for the user; and
generating the cryptographic key from the identity key.

10. The computer-implemented method of claim 1 wherein the vector is extracted at least in part from the latent space of an inner layer of the machine learning model.

11. The computer-implemented method of claim 1 wherein the vector is extracted at least in part from an output layer of the machine learning model.

12. The computer-implemented method of claim 1 wherein the user signal comprises a biometric signal measured by a computing device.

13. The computer-implemented method of claim 12 wherein the user signal comprises at least one of a facial image of the user, an iris image of the user, an infrared image of the user, and a fingerprint of the user.

14. The computer-implemented method of claim 1 wherein the user signal comprises more than one image.

15. The computer-implemented method of claim 1 wherein the user signal comprises a digital object associated with the user.

16. The computer-implemented method of claim 1 wherein the user signal comprises a digital object provided by a device operated by the user.

17. The computer-implemented method of claim 1 wherein the machine learning model comprises a CNN.

18. The computer-implemented method of claim 1 wherein the user signal comprises an image, and the machine learning model comprises an image classifier.

19. A non-transitory computer-readable storage medium storing executable computer program instructions for generating a cryptographic key for a user, the instructions executable by a computer system and causing the computer system to:
receive a user signal associated with a biometric of the user;
input, to a machine learning model, the user signal associated with the user;
extract a vector from one or more outputs of one or more layers of the machine learning model, wherein the vector is an embedding vector extracted from a latent space of the machine learning model, wherein the machine learning model is trained to separate different signals from different people in training samples; and
generate a cryptographic key from the embedding vector, wherein generating the cryptographic key comprises:
encode the embedding vector into a binary spatial segment field representation in which Hamming distance between binary spatial segment field representations approximates distance between corresponding embedding vectors in a learned vector space;
apply a Reed Solomon error correction encoding scheme to the binary spatial segment field representation;
generate, based on the Reed Solomon error correction encoding scheme, a seed for the cryptographic key; and
generate the cryptographic key based on the seed, wherein subsequent measurements of biometric signals of the user result in additional embedding vectors that, when encoded into additional binary spatial segment field representations, are correctable by the Reed Solomon error correction encoding scheme to re-generate the seed.

20. The non-transitory computer-readable storage medium of claim 19 wherein:
the machine learning model operates to cluster together vectors produced by different variations of the user signal from the same user, and the same cryptographic key is generated for different vectors produced by different variations of the user signal from the same user; and
the machine learning model operates to separate vectors produced by user signals from different users, and different cryptographic keys are generated from vectors for different users.

* * * * *